(12) United States Patent
Howarth et al.

(10) Patent No.: US 12,228,113 B2
(45) Date of Patent: Feb. 18, 2025

(54) SMA ACTUATOR ASSEMBLY

(71) Applicant: CAMBRIDGE MECHATRONICS LIMITED, Cambridge (GB)

(72) Inventors: James Howarth, Cambridge (GB); Andrew Benjamin Simpson Brown, Cambridge (GB); René Kist, Cambridge (GB); Stephen Matthew Bunting, Cambridge (GB); Alexander Doust, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/569,309

(22) PCT Filed: Jun. 17, 2022

(86) PCT No.: PCT/GB2022/051551
§ 371 (c)(1),
(2) Date: Dec. 12, 2023

(87) PCT Pub. No.: WO2022/263856
PCT Pub. Date: Dec. 22, 2022

(65) Prior Publication Data
US 2024/0271606 A1 Aug. 15, 2024

(30) Foreign Application Priority Data

Jun. 17, 2021 (GB) .................................. 2108682

(51) Int. Cl.
*F03G 7/06* (2006.01)
(52) U.S. Cl.
CPC ........ *F03G 7/06143* (2021.08); *F03G 7/0645* (2021.08)

(58) Field of Classification Search
CPC .................................................... F03G 7/0645
See application file for complete search history.

(56) References Cited

U.S. PATENT DOCUMENTS

2014/0130492 A1    5/2014   Suissa et al.

FOREIGN PATENT DOCUMENTS

| WO | 2020110091 A2 | 6/2020 | |
| WO | WO-2020156664 A1 * | 8/2020 | ............. F03G 7/065 |
| WO | 2021123353 A1 | 6/2021 | |

OTHER PUBLICATIONS

English Translation WO2020156664A1 (Year: 2020).*

(Continued)

*Primary Examiner* — Shafiq Mian
(74) *Attorney, Agent, or Firm* — Van Hoven PC; Stefan D. Osterbur; Joshua Van Hoven

(57) ABSTRACT

An SMA actuator assembly (1a) for driving or rotating a movable part (20) in a predetermined direction or sense by a plurality of repeated incremental steps is provided. The SMA actuator assembly comprises the movable part; a first engagement portion (31) for engaging the movable part; two SMA wires (41, 42) arranged to move the first engagement portion such that the first engagement portion repeatedly, for each of said incremental steps, is configured to do the following: engage with the movable part from a starting position, exert a force or torque on the movable part in the predetermined direction and disengage from the movable part and return to the starting position. The exertion of the force or torque on the movable part and the engaging or disengaging with the movable part are caused by contraction or relaxation of the two SMA wires.

11 Claims, 19 Drawing Sheets

(56) References Cited

OTHER PUBLICATIONS

GB Examination and Search Report of GB Application No. 2108682.2 dated May 10, 2022.
International Search Report and Written Opinion of PCT/GB2022/051551 dated Oct. 10, 2022.

* cited by examiner

SMA ACTUATOR ASSEMBLY

CROSS-REFERENCE TO RELATED APPLICATIONS

This application is a national stage application under 35 U.S.C. § 371 of International Application No. PCT/GB2022/051551, filed Jun. 17, 2022, which claims priority of GB Patent Application No. 2108682.2, filed Jun. 17, 2021, the disclosures of each of which are hereby incorporated by reference herein in their entireties.

The present invention generally relates to the use of shape memory alloy (SMA) wires to drive the motion, i.e. translation or rotation, of a movable part.

There are a variety of apparatuses in which it is desired to provide control of a movable part. SMA wires may be advantageous as actuators in such apparatuses, for example due to their high energy density which means that the SMA actuator required to apply a given force to the movable part can be relatively small.

One type of assembly in which SMA wire is known for use as an actuator is in miniature cameras, for example those used in smartphones or other portable electronic devices. WO 2011/104518 discloses examples of SMA actuation assemblies which are suitable for use in miniature cameras.

However, the stroke length (maximum displacement) that can be achieved from an SMA wire is relatively limited: approximately 2% of the SMA wire length, typically equating to around 40-150 μm of absolute stroke. In various applications, larger translational or rotational displacements are required, for example several mm.

One example in which greater stroke may be required from an SMA actuator is in the control of irises for miniature cameras. In such devices it is desirable to achieve significant stroke whilst keeping the space occupied by the actuator assembly as small as possible. However, in general, SMA actuators with increased stroke can find application in any SMA actuator assemblies. Further applications include optical zoom in cameras (in which a lens carriage comprising one or more lenses is moved along the optical axis of the one or more lenses in order focus an image on the image sensor) and in pop-out cameras (e.g. for optical zoom in a pop-out). The term pop-out camera refers to a camera implemented in a device such as a smartphone in which one or more lenses are moved between a collapsed configuration in which the optical assembly is not able to focus light onto the image sensor of the device to form an image and an operative configuration in which the optical assembly is able to focus light onto the image sensor.

An object of the present invention is to provide SMA actuator assemblies with greater, or in some cases unlimited, translational or rotational stroke. A further object of some aspects of the present invention is to provide assemblies which have a low form factor, and which are, for example, suitable for use in folded camera assemblies and other apparatuses in which the space available for control assemblies is limited. Such assemblies may be suitable for controlling the operation of an iris, for controlling zoom in a camera, e.g. in a pop-up camera.

Aspects of the present invention aim to provide actuator assemblies which satisfy one or more of the above objects.

At their broadest, aspects of the present disclosure provide SMA actuator assemblies in which an SMA wire is operable to repeatedly move a driven element in a desired translational or angular direction.

According to a first aspect, there is provided an SMA actuator assembly for driving or rotating a movable part in a predetermined direction or sense by a plurality of repeated incremental steps, the SMA actuator assembly comprising: the movable part; a first engagement portion for engaging the movable part; two SMA wires arranged to move the first engagement portion such that the first engagement portion repeatedly, for each of said incremental steps, is configured to: engage with the movable part from a starting position; exert a force or torque on the movable part in the predetermined direction; and disengage from the movable part and return to the starting position, wherein the exertion of the force or torque on the movable part and the engaging and disengaging with the movable part are caused by contraction or relaxation of the two SMA wires. The two SMA wires together are arranged to control the engagement and/or disengagement of the first engagement portion. A first SMA wire of the two SMA wires is arranged, on contraction, to cause the first engagement portion to exert a force or torque on the movable part in the predetermined direction or sense. A second of the two SMA wires is arranged, on contraction, to cause the first engagement portion to exert a force or torque on the movable part in a second direction or sense that is opposite to the predetermined direction or sense. The actuator assembly comprises a second engagement portion for engaging the movable part, wherein at least one SMA wire is arranged to move the second engagement portion so as to engage with the movable part to control the position of the movable part during at least a part of the time when the first engagement portion is disengaged from the movable part.

The SMA actuator assembly may provide the movable part with increased translational or rotational stroke compared to a movable part directly connected and actuated by an SMA wire. Further, this configuration may be simpler to manufacture and to control compared to assemblies comprising three or more SMA wires provided for these purposes. Additionally, the second engagement portion provides control of the position of the movable part when the first engagement portion is disengaged from the movable part.

In some embodiments, the two SMA wires are arranged to move the first engagement portion, so as to cause driving or rotating of the movable part in the second direction or sense by a plurality of repeated incremental steps, such that the first engagement portion repeatedly is configured to: engage with the movable part from a starting position; exert a force or torque on the movable part in the second direction or sense; and disengage from the movable part and return to the starting position, wherein the exertion of the force or torque on the movable part and/or the engaging or disengaging with the movable part are caused by contraction or relaxation of the two SMA wires.

Bi-directional drive, i.e. bi-directional translation or rotation, may thus be enabled in the SMA actuator assembly.

In some embodiments, the first and second SMA wires are angled with respect to each-other. In other words, an angle between the first and second wires is between (but not equal to) 0 and 90 degrees (i.e. they are not parallel or perpendicular to each-other). The first and second SMA wires may form a 'V' shape. In embodiments in which the movable part is moved in a predetermined direction, there may be an acute angle between the predetermined direction and one or both of the first and second SMA wires.

As described above, the actuator assembly comprises a second engagement portion for engaging the movable part, wherein at least one SMA wire is arranged to move the second engagement portion so as to engage with or disengage from the movable part to control the position of the movable part during at least a part of the time when the first engagement portion is disengaged from the movable part. Preferably, the second engagement portion is biased by a resilient element into engagement with the movable part, and the SMA wire is arranged to disengage the second engagement portion. This allows the second engagement portion to hold the movable part in position when power is not supplied to the SMA wire. In some embodiments, the second engagement portion is arranged to maintain the position of the movable part during at least part of the time when the first engagement portion is disengaged from the movable part. In this way, the second engagement portion acts as a holding engagement portion.

In some embodiments, the at least one SMA wire is arranged to move the second engagement portion such that the second engagement portion repeatedly, for each of said incremental steps, is configured to: engage with the movable part from a starting position; exert a force or torque on the movable part in the predetermined direction or sense; and disengage from the movable part and return to the starting position, wherein the exertion of the force or torque on the movable part and/or the engaging with or disengaging from the movable part are caused by contraction or relaxation of the at least one SMA wire. The second engagement portion may be similar or identical to the first engagement portion, and may be controlled by SMA wire(s) in a similar manner. Provision of the second engagement portion decreases the down-time in which the movable part is not driven, during returning of an engagement portion to a respective starting position, and/or may increase the force or torque applied to the movable part. Further engagement portions may be provided such that overall a plurality of engagement portions are provided. The engagement portions may be provided at different positions along the movable part (e.g. different angular or linear positions along the movable part, or on different sides of the movable part).

In some embodiments, the at least one SMA wire may comprise two further SMA wires (i.e. two SMA wires in addition to the two SMA wires which control the engagement/disengagement of the first engagement portion), wherein the two further SMA wires together are arranged to control the engagement and/or disengagement of the second engagement portion. A first SMA wire of the two further SMA wires may be arranged, on contraction, to cause the second engagement portion to exert a force or torque on the movable part in the predetermined direction or sense and a second of the two further SMA wires may be arranged, on contraction, to cause the second engagement portion to exert a force or torque on the movable part in the second direction or sense.

In some embodiments, the second engagement portion exerts a force or torque on the movable part during at least part of the time when the first engagement portion is disengaged from the movable part. This decreases the downtime in which the movable part is not driven, during returning of an engagement portion to a respective starting position.

In some embodiments, the second engagement portion exerts a force or torque on the movable part during the time when the first engagement portion is disengaged from the movable part such that a force or torque is continuously applied to the movable part either by the first or by the at least one second engagement portion. This allows continuous movement or rotation of the movable part.

In some embodiments, the second engagement portion is configured to engage the movable part before the first engagement portion disengages from the movable part, and wherein the first engagement portion is configured to engage the movable part before the at least one second engagement portion disengages from the movable part. The overlap in engagement may ensure a more fluid continuous movement or rotation of the movable.

In some embodiments, the first and/or second engagement portions have a series of first teeth and the movable part has a series of second teeth and the first and second teeth are arranged to engage with each other when an engagement portion engages with the movable part. The provision of teeth reduces the risk of slipping between the engagement portion and movable part, improving the efficiency of moving or rotating the movable part.

In some embodiments, the first and/or second engagement portions are arranged to transfer force exerted by an SMA wire to the movable part by friction. Avoiding the use of teeth may improve control of the motion of the movable part, by avoiding the need of aligning the teeth during engagement of the engagement portions with the movable part.

Some embodiments further include a biasing element which is arranged to oppose the motion caused by the contraction of at least one SMA wire, for example the first and second SMA wires and/or the first and second wires of the two further SMA wires. The biasing element may be a resilient element, for example, such as a flexure or other type of spring. The biasing element may comprise one or more magnets. The resilient element may be used to engage or disengage the engagement portions, for example the first engagement portion and/or the second engagement portion. The resilient element may be used to exert a force or torque on the movable part. A further such biasing element may be provided to engage or disengage the second engagement portion.

In some embodiments the actuator assembly includes a biasing element which is arranged to bias the first engagement portion into or out of engagement with the movable part. For example, the biasing element may be a flexure or spring and/or may comprise one or more magnets.

In some embodiments, the biasing element is in sliding or rolling contact with the support structure. As the first engagement portion exerts a force or torque on the movable part, the biasing element slides or rolls relative to the support structure. Accordingly, the biasing element only acts to bias the first engagement portion into engagement and does not itself provide a force or torque on the movable part to move it in the predetermined direction/sense. Such a biasing element may be provided for the second engagement portion.

In other embodiments, at least a portion of the biasing element remains stationary relative to the support structure as the movable part moves in the predetermined direction or sense. Such a portion may comprise an end of a biasing element (e.g. an end of a spring or flexure). For example, the biasing element may comprise a spring or flexure which is coupled or connected at a first portion to the movable part (e.g. via a crimp) and is connected at a second portion (e.g. an end of the spring or flexure) to the support structure (e.g. via a crimp). This may simplify the electrical connections in embodiments in which the biasing element also provides an electrical connection.

In some embodiments, the movable part is elongate in the predetermined direction and translationally movable in the predetermined direction. Such a movable part may be used as a linear actuator with increased stroke, for example compared to an SMA wire acting as a linear actuator.

In some embodiments, the movable part is a rotating part that is rotatable about a rotation axis. Such a movable part may be used as a rotating actuator or motor.

In some embodiments, the first engagement portion is mounted on a housing, the housing being pivotable relative to the movable part, wherein the pivoting of the housing is arranged to amplify the contraction or relaxation of the SMA wire to cause a greater extent of movement of the first engagement portion in the predetermined direction. In general, embodiments may comprise an amplification mechanism for increasing the stroke of the SMA wires so as to move the movable part. Such amplification mechanisms may comprise angled (e.g. V-shaped) SMA wires or levers (such as the pivoting housing).

Some embodiments further comprise a bearing which is arranged to allow the movable part to move or rotate in the predetermined direction or sense and, as appropriate, the second direction or sense. The bearing may be a plain bearing, comprising two surfaces that directly bear onto one another. Alternatively, the bearing may be a rolling bearing, i.e. a roller bearing comprising a roller between bearing surfaces or a ball bearing comprising a ball between bearing surfaces. The bearing may also be a flexure bearing.

Some embodiments further comprise an iris mechanism arranged to control the size of an aperture in an iris, wherein the movable part is coupled to the iris mechanism so that motion of the movable part in the predetermined direction causes the aperture to open or close. In some embodiments, the coupling of the movable part to the iris mechanism amplifies the movement or rotation of the movable part. Some embodiments further include the iris having the aperture. Some embodiments further comprise an image sensor arranged to receive light passing through the iris.

Some embodiments further include: a control circuit electrically connected to the at least one SMA wire for supplying drive signals thereto; and a sensor arranged to generate output signals representative of the amount or intensity of light arriving at the image sensor, wherein the control circuit is arranged to generate the drive signals in response to said output signals to open or close the aperture and thereby adjust the amount of light arriving at the image sensor.

According to the present disclosure, there is also provided an SMA actuator assembly for rotating a rotating part in a predetermined sense by a plurality of repeated incremental steps, the SMA actuator assembly comprising: the rotating part; a first engagement portion for engaging the rotating part; at least one SMA wire arranged to move the first engagement portion such that the first engagement portion repeatedly, for each of said incremental steps, is configured to: engage with the movable part from a starting position; move so as to exert a torque on the movable part in the predetermined sense; and disengage from the movable part and return to the starting position, wherein the exertion of the torque on the movable part and/or the engaging or disengaging with the movable part are caused by contraction or relaxation of the at least one SMA wire.

Such an SMA actuator assembly may be used as an SMA motor. The SMA motor can be used in any application that requires rotation, e.g. in gimbals for a drone, in model cars or in certain haptic feedback articles.

Some embodiments comprise another SMA wire arranged to move the first engagement portion, so as to cause rotating of the rotating part in a second sense that is opposite to the predetermined sense by a plurality of repeated incremental steps, such that the first engagement portion repeatedly is configured to: engage with the rotating part from a starting position; move so as to exert a torque on the rotating part in the second sense; and disengage from the rotating part and return to the starting position, wherein the exertion of the torque on the movable part and/or the engaging or disengaging with the movable part are caused by contraction or relaxation of the other SMA wire. This enables bi-directional rotation.

Some embodiments further comprise at least one second engagement portion for engaging the rotating part, wherein at least one second SMA wire is arranged move a respective at least one second engagement portion such that each of the at least one second engagement portion repeatedly, for each of said incremental steps, is configured to: engage with the rotating part from a respective starting position; move so as to exert a torque on the rotating part in the predetermined sense; and disengage from the movable part and return to the starting position, wherein the exertion of the torque on the rotating part and/or the engaging or disengaging with the rotating part are caused by contraction or relaxation of the at least one second SMA wire. Rotation of the rotating part may thus be made continuous or near-continuous, or the torque applied to the rotating part may be increased.

According to a further aspect, there is provided a method of manufacturing an SMA actuator assembly as described herein. The method comprises:

providing a strut element shaped to comprise a sacrificial strut body and crimp tabs held apart by the sacrificial strut body;

laying at least one shape memory alloy wire across the crimp tabs of the strut element;

folding and pressing the crimp tabs over the shape memory alloy wire to form crimps holding the shape memory alloy wire therebetween;

attaching at least one of the crimps to the support structure; and removing the sacrificial strut body, leaving the at least one crimp attached to the support structure.

In some embodiments, the strut element comprises a first sacrificial body and a second sacrificial body, wherein the first sacrificial body holds apart a first crimp tab and a central crimp tab and the second sacrificial body holds apart the central crimp tab and a second crimp tab, and wherein attaching at least one of the crimps to the support structure comprises attaching the first and second crimp tabs to the support structure.

In some embodiments, laying at least one shape memory alloy wire across the crimp tabs of the strut element comprises laying the first SMA wire between the first crimp tab and the central crimp tab and laying the second SMA wire between the central crimp tab and the second crimp tab.

In some embodiments, the central crimp tab is integral with an element which is bent to form the biasing element.

According to a further aspect, there is provided an SMA actuator assembly for driving or rotating a movable part in a predetermined direction or sense by a plurality of repeated incremental steps, the SMA actuator assembly comprising: the movable part; a first engagement portion for engaging the movable part; at least one SMA wire arranged to move the first engagement portion such that the first engagement portion repeatedly, for each of said incremental steps, is configured to: engage with the movable part from a starting position; exert a force or torque on the movable part in the predetermined direction; and disengage from the movable part and return to the starting position, wherein the exertion of the force or torque on the movable part and/or the engaging or disengaging with the movable part are caused by contraction or relaxation of the at least one SMA wire and wherein the actuator assembly comprises a biasing element which is arranged to bias the first engagement portion into or out of engagement with the movable part and wherein the biasing element is in sliding or rolling contact with the support structure.

The SMA actuator assembly may provide the movable part with increased translational or rotational stroke compared to a movable part directly connected and actuated by an SMA wire.

In some embodiments, the at least one SMA wire is arranged to move the first engagement portion, so as to cause driving or rotating of the movable part in a second direction or sense that is opposite to the predetermined direction or sense by a plurality of repeated incremental steps, such that the first engagement portion repeatedly is configured to: engage with the movable part from a starting position; exert a force or torque on the movable part in the second direction or sense; and disengage from the movable part and return to the starting position, wherein the exertion of the force or torque on the movable part and/or the engaging or disengaging with the movable part are caused by contraction or relaxation of the at least one SMA wire.

Bi-directional drive, i.e. bi-directional translation or rotation, may thus be enabled in the SMA actuator assembly.

In some embodiments, the at least one SMA wire comprises at least two SMA wires, wherein one SMA wire is arranged to control the engagement and/or disengagement of the first engagement portion and another SMA wire is arranged to independently cause the first engagement portion to exert the force or torque on the movable part. Independently controlling engagement/disengagement and the exertion of a force/torque on the movable element may allow for more accurate control of the SMA actuator assembly. In some other embodiments, engagement/disengagement and the exertion of a force/torque may not be independent, in that one SMA wire may be arranged for both purposes. For example, contraction of the SMA wire by an initial amount may bring the first engagement portion into engagement with the movable part, and further contraction of the SMA wire by a further amount may exert a force or torque on the movable part.

In some embodiments, the at least one SMA wire comprises at least two SMA wires, wherein one SMA wire is arranged, on contraction, to cause the first engagement portion to exert a force or torque on the movable part in the predetermined direction or sense and another SMA wire is arranged, on contraction, to cause the first engagement portion to exert a force or torque on the movable part in the second direction or sense. The at least one SMA wire may comprise at least three SMA wires, two of them arranged to exert the force or torque in opposite directions or senses, and one arranged independently to control engagement and/or disengagement of the first engagement portion.

Some embodiments comprise at least two SMA wires, wherein two SMA wires together are arranged to control the engagement and/or disengagement of the first engagement portion, wherein one of the two SMA wires is arranged, on contraction, to cause the first engagement portion to exert a force or torque on the movable part in the predetermined direction or sense and the other of the two SMA wires is arranged, on contraction, to cause the first engagement portion to exert a force or torque on the movable part in the second direction or sense. Such embodiments may be simpler to manufacture and to control compared to embodiments comprising three SMA wires provided for these purposes.

Some embodiments further comprise a holding engagement portion for engaging the movable part, wherein an SMA wire is arranged to move the holding engagement portion so as to engage with or disengage from the movable part to maintain the position of the movable part during at least a part of the time when the first engagement portion is disengaged from the movable part. Preferably, the holding engagement portion is biased by a resilient element into engagement, and the SMA wire is arranged to disengage the holding engagement portion. This allows the holding engagement portion to hold the movable part in position when power is not supplied to the SMA wire.

Some embodiments further comprise at least one second engagement portion for engaging the movable part, wherein at least one SMA wire is arranged move the at least one second engagement portion such that each of the at least one second engagement portion repeatedly, for each of said incremental steps, is configured to: engage with the movable part from a starting position; exert a force or torque on the movable part in the predetermined direction or sense; and disengage from the movable part and return to the starting position, wherein the exertion of the force or torque on the movable part and/or the engaging with or disengaging from the movable part are caused by contraction or relaxation of the at least one SMA wire. The at least one second engagement portion may comprise one or multiple engagement portions, such that overall a plurality of engagement portions are provided. Each of the at least one second engagement portions may be similar or identical to the first engagement portion, and may be controlled by SMA wires in a similar manner. The at least one second engagement portion may be provided at different positions along the movable part (e.g. different angular or linear positions along the movable part, or on different sides of the movable part). Provision of the at least one second engagement portion decreases the down-time in which the movable part is not driven, during returning of an engagement portion to a respective starting position, or increase the force or torque applied to the movable part.

In some embodiments, the at least one second engagement portion exerts a force or torque on the movable part during at least part of the time when the first engagement portion is disengaged from the movable part. This decreases the down-time in which the movable part is not driven, during returning of an engagement portion to a respective starting position.

In some embodiments, the at least one second engagement portion exerts a force or torque on the movable part during the time when the first engagement portion is disengaged from the movable part such that a force or torque is continuously applied to the movable part either by the first or by the at least one second engagement portion. This allows continuous movement or rotation of the movable part.

In some embodiments, the at least one second engagement portion is configured to engage the movable part before the first engagement portion disengages from the movable part, and wherein the first engagement portion is configured to engage the movable part before the at least one second engagement portion disengages from the movable part. The overlap in engagement may ensure a more fluid continuous movement or rotation of the movable.

In some embodiments, the first and/or at least one second engagement portions have a series of first teeth and the movable part has a series of second teeth and the first and second teeth are arranged to engage with each other when an engagement portion engages with the movable part. The provision of teeth reduces the risk of slipping between the engagement portion and movable part, improving the efficiency of moving or rotating the movable part.

In some embodiments, the first and/or at least one second engagement portions are arranged to transfer force exerted by an SMA wire to the movable part by friction. Avoiding the use of teeth may improve control of the motion of the movable part, by avoiding the need of aligning the teeth during engagement of the engagement portions with the movable part.

As mentioned above, the actuator assembly comprises a biasing element for biasing the engagement portion into or out of engagement with the movable part. In some embodiments, the biasing element is arranged to oppose the motion caused by the contraction of at least one SMA wire. The biasing element may be a resilient element, for example, such as a flexure or other type of spring. The resilient element may be used to engage or disengage the engagement portions. The resilient element may be used to exert a force or torque on the movable part.

In some embodiments, the movable part is elongate in the predetermined direction and translationally movable in the predetermined direction. Such a movable part may be used as a linear actuator with increased stroke, for example compared to an SMA wire acting as a linear actuator.

In some embodiments, the movable part is a rotating part that is rotatable about a rotation axis. Such a movable part may be used as a rotating actuator or motor.

In some embodiments, the first engagement portion is mounted on a housing, the housing being pivotable relative to the movable part, wherein the pivoting of the housing is arranged to amplify the contraction or relaxation of the SMA wire to cause a greater extent of movement of the first engagement portion in the predetermined direction. In general, embodiments may comprise an amplification mechanism for increasing the stroke of the SMA wires so as to move the movable part. Such amplification mechanisms may comprise angled (e.g. V-shaped) SMA wires or levers (such as the pivoting housing).

Some embodiments further comprise a bearing which is arranged to allow the movable part to move or rotate in the predetermined direction or sense and, as appropriate, the second direction or sense. The bearing may be a plain bearing, comprising two surfaces that directly bear onto one another. Alternatively, the bearing may be a rolling bearing, i.e. a roller bearing comprising a roller between bearing surfaces or a ball bearing comprising a ball between bearing surfaces. The bearing may also be a flexure bearing.

Some embodiments further comprise an iris mechanism arranged to control the size of an aperture in an iris, wherein the movable part is coupled to the iris mechanism so that motion of the movable part in the predetermined direction causes the aperture to open or close. In some embodiments, the coupling of the movable part to the iris mechanism amplifies the movement or rotation of the movable part. Some embodiments further include the iris having the aperture. Some embodiments further comprise an image sensor arranged to receive light passing through the iris.

Some embodiments further include: a control circuit electrically connected to the at least one SMA wire for supplying drive signals thereto; and a sensor arranged to generate output signals representative of the amount or intensity of light arriving at the image sensor, wherein the control circuit is arranged to generate the drive signals in response to said output signals to open or close the aperture and thereby adjust the amount of light arriving at the image sensor.

According to the present invention, there is also provided an SMA actuator assembly for rotating a rotating part in a predetermined sense by a plurality of repeated incremental steps, the SMA actuator assembly comprising: the rotating part; a first engagement portion for engaging the rotating part; at least one SMA wire arranged to move the first engagement portion such that the first engagement portion repeatedly, for each of said incremental steps, is configured to: engage with the movable part from a starting position; move so as to exert a torque on the movable part in the predetermined sense; and disengage from the movable part and return to the starting position, wherein the exertion of the torque on the movable part and/or the engaging or disengaging with the movable part are caused by contraction or relaxation of the at least one SMA wire.

Such an SMA actuator assembly may be used as an SMA motor. The SMA motor can be used in any application that requires rotation, e.g. in gimbals for a drone, in model cars or in certain haptic feedback articles.

Some embodiments comprise another SMA wire arranged to move the first engagement portion, so as to cause rotating of the rotating part in a second sense that is opposite to the predetermined sense by a plurality of repeated incremental steps, such that the first engagement portion repeatedly is configured to: engage with the rotating part from a starting position; move so as to exert a torque on the rotating part in the second sense; and disengage from the rotating part and return to the starting position, wherein the exertion of the torque on the movable part and/or the engaging or disengaging with the movable part are caused by contraction or relaxation of the other SMA wire. This enables bi-directional rotation.

Some embodiments further comprise at least one second engagement portion for engaging the rotating part, wherein at least one second SMA wire is arranged move a respective at least one second engagement portion such that each of the at least one second engagement portion repeatedly, for each of said incremental steps, is configured to: engage with the rotating part from a respective starting position; move so as to exert a torque on the rotating part in the predetermined sense; and disengage from the movable part and return to the starting position, wherein the exertion of the torque on the rotating part and/or the engaging or disengaging with the rotating part are caused by contraction or relaxation of the at least one second SMA wire. Rotation of the rotating part may thus be made continuous or near-continuous, or the torque applied to the rotating part may be increased.

In any of the embodiments which refer to moving the movable part in a predetermined direction, the support structure may comprise a helical bearing surface along which the movable part is configured to move. Accordingly, the actuator assembly may be configured such that as the movable part moves in the predetermined direction it follows a helical path. In some embodiments, the actuator assembly may be configured to also allow movement of the movable part in a direction perpendicular to the predetermined direction.

In some embodiments, a holding arrangement may be provided. The holding arrangement may be configured to maintain the position of the movable part relative to the support structure when the SMA wire(s) is/are in an unpowered state. The holding arrangement may comprise a flexure, a spring, and/or one or more magnets.

In some embodiments, one or more (e.g. two) endstops may be provided to constrain the movement of the movable part when the SMA wire(s) are in an unpowered state. The one or more endstops may be configured to contact the first and or second engagement portion(s).

The SMA actuator assembly of the present invention may include any combination of some, all or none of the above-described preferred and optional features.

The present invention may in general be applied to any type of device that comprises a static part and a moveable part which is moveable with respect to the static part. By way of non-limitative example, the actuator assembly may be, or may be provided in, any one of the following devices: a smartphone, a protective cover or case for a smartphone, a functional cover or case for a smartphone or electronic device, a camera, a foldable smartphone, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, an autonomous vehicle (e.g. a driverless car), a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, a flexible surface, and a wireless communication device (e.g. near-field communication (NFC) device). It will be understood that this is a non-exhaustive list of example devices.

Actuator assemblies as described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

Embodiments of the present invention will now be described by way of example with reference to the accompanying drawings in which:

FIG. 10b shows an alternate view of the actuator assembly shown in FIG. 10a;

Figure 1A:
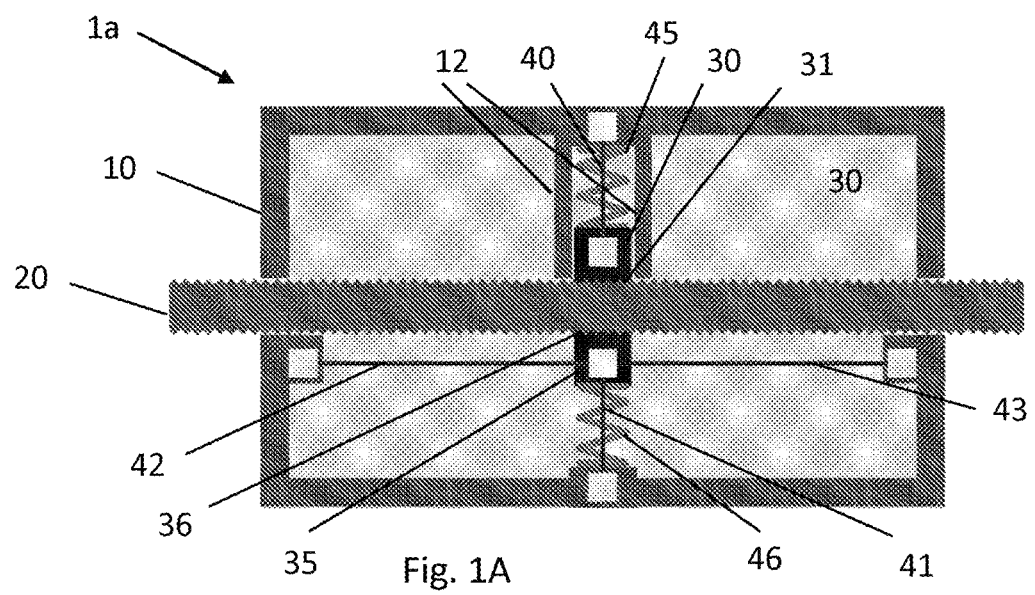
FIG. 1 shows a sequence of operation of an SMA actuator assembly according to an embodiment of the present invention.

FIGS. 1 to 4 show SMA actuator assemblies according to different embodiments of the present disclosure and their sequences of operation. These actuator assemblies have common features which are numbered with the same reference numerals. To avoid repetition, unless explicitly specified or practically impossible, the description of a feature in one embodiment is to be understood as applying to that feature, and variants of that feature, in all other embodiments.

FIG. 1 shows an SMA actuator assembly 1a according to a first embodiment of the present disclosure. The actuator assembly has a fixed support structure 10 and is arranged to progressively drive a movable part 20 in a linear fashion (i.e. in the horizontal direction in the figures). The movable part 20 may be supported on the support structure 10 in a manner allowing translational movement of the movable part 20 relative to the support structure 10. In the depicted embodiment, the movable part 20 is a drive shaft 20, but it will be appreciated that any other movable part 20 may generally be provided.

Two engagement portions 31, 36 may selectively engage the movable part 20. The engagement portions 31, 36 are provided on clamps 30, 35 in the depicted embodiment, but it will be appreciated that engagement portion may generally be provided in any other appropriate shape or form. SMA wires 40-43 are connected between the clamps 30, 35 and the support structure 10. A first of the clamps 30 is a holding clamp. It is constrained to move only in opposed directions perpendicular to the longitudinal extent of the drive shaft 20 by walls 12 (which may be separate walls, or may be part of an enclosure surrounding the holding clamp 30). It will be appreciated that other approaches could be used to constrain the motion of the holding clamp 30, such as one or more bearings.

The holding clamp 30 has an engagement portion 31 which engages with an outer surface of the drive shaft 20. In the arrangement shown, the engagement portion 31 is toothed and engages with a corresponding toothed (or helical) arrangement on the outer surface of the drive shaft 20. However, the engagement portion 31 may have other configurations which are suitable for transferring a lateral force between the clamp 30 and the drive shaft 20, such as a textured surface with a relatively high coefficient of friction.

The holding clamp 30 is connected to the support structure 10 by a first SMA wire 40. This first SMA wire 40 acts against a compression spring 45 such that contraction (on actuation by heating) of the SMA wire 40 causes the holding clamp 30 to retract from engagement with the drive shaft 20 and, when the actuation of the SMA wire 40 ceases, the wire relaxes back to its resting length and the engagement portion 31 of the holding clamp 30 is urged into contact with the drive shaft 20 by the compression spring 45.

The holding clamp 30 and associated features are optional, and in some embodiments of the present invention, the holding clamp 30 is omitted.

The second clamp 35 is a moving or drive clamp. This clamp 35 is connected to the support structure 10 by three SMA wires 41-43 which are arranged in a T-shaped arrangement as viewed from the side as in FIG. 1. Two of the SMA wires 42, 43 are arranged in opposite directions substantially parallel to the longitudinal extent of the drive shaft 20, with their fixed ends attached to the support structure 10 and their movable ends attached to the drive clamp 35. The third SMA wire 41 is arranged perpendicular to the longitudinal extent of the drive shaft 20.

As with the holding clamp 30, the drive clamp 35 has an engagement portion 36 which engages with an outer surface of the drive shaft 20. In the arrangement shown, the engagement portion 36 is toothed and engages with a corresponding toothed (or helical) arrangement on the outer surface of the drive shaft 20. However, again, the engagement portion 36 may have other configurations which are suitable for transferring a lateral force between the clamp 30 and the drive shaft 20.

The SMA wires 41-43 control the movement of the drive clamp 35, in conjunction with a further compression spring 46 which acts against the contracting motion of the perpendicular SMA wire 41 so as to urge the engagement portion 36 of the drive clamp 35 into contact with the drive shaft 20 when the SMA wire 41 is in a resting (un-actuated) position.

FIGS. 1A-1F show how the actuator assembly 1a can be used to drive the drive shaft 20 by a series of repeated incremental drive motions. FIG. 1A shows the actuator assembly 1a at rest with none of the SMA wires 40-43 actuated. In this arrangement the compression springs 45, 46 urge the clamps 30, 35 into contact with the outer surface of the drive shaft 20 and therefore "lock" the position of the drive shaft against any external forces that may act on it. In the resting position shown in FIG. 1A some or all of the SMA wires 40-43 may be slack such that their length is greater than the straight-line distance between the points at which they are connected to the support structure 10 and one of the clamps 30, 35.

Figure 1B:
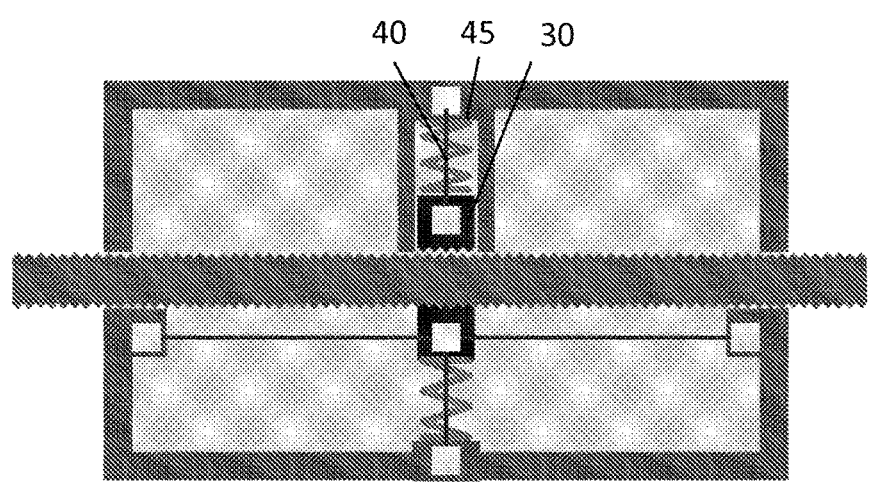
Figure 1C:
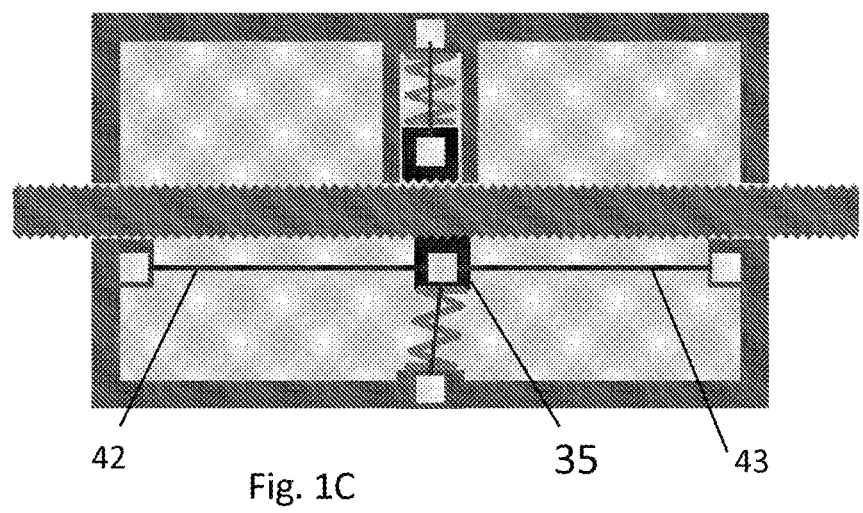

To move the drive shaft 20, first the holding clamp 30 is pulled out of engagement with the drive shaft 20 by actuation of the SMA wire 40, as shown in FIG. 1B. Next the drive clamp 35 is driven sideways (to the right as viewed in FIG. 1) by the actuation of the SMA wire 43 which extends parallel to the longitudinal extent of the drive shaft 20, as shown in FIG. 1C. Depending on the arrangement of the opposing SMA wire 42, this may be accompanied by a relaxation of that SMA wire 42, or may result in the taking up of some or all of the slack in that SMA wire 42 from the rest position.

Figure 1D:
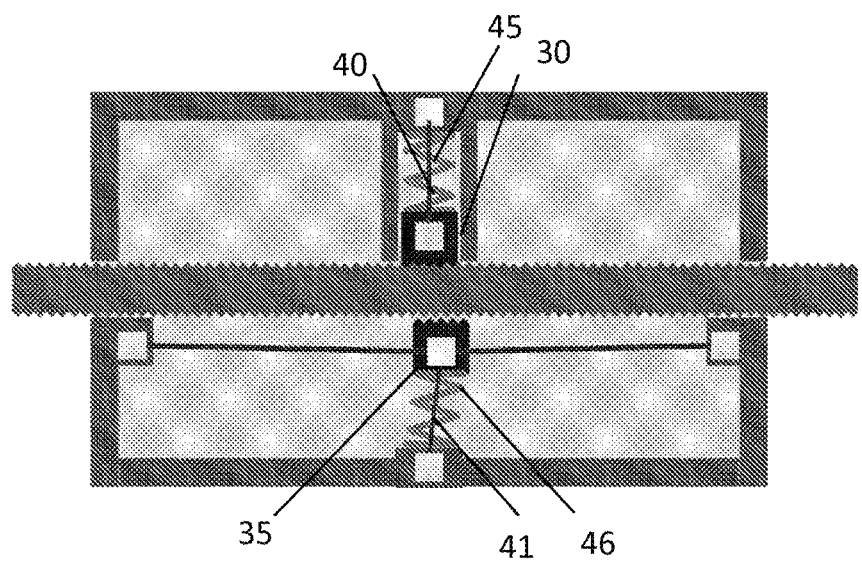

Once the drive clamp 35 has moved to the desired extent, the holding clamp 30 is locked back onto the drive shaft 20 by relaxing the SMA wire 40, which causes the spring 31 to urge the engagement surface 31 of the holding clamp back into contact with the outer surface of the drive shaft 20. The drive clamp 35 is then removed from contact with the drive shaft 20 by actuation of the perpendicular SMA wire 41, as shown in FIG. 1D.

Figure 1E:
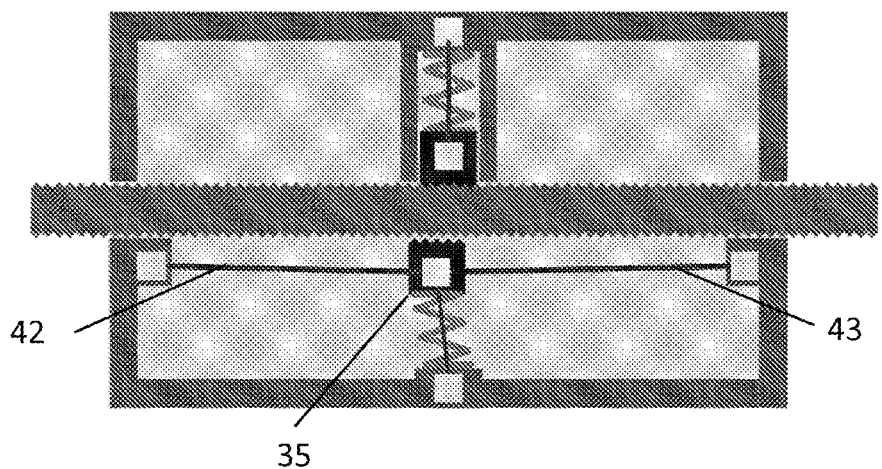
Figure 1F:
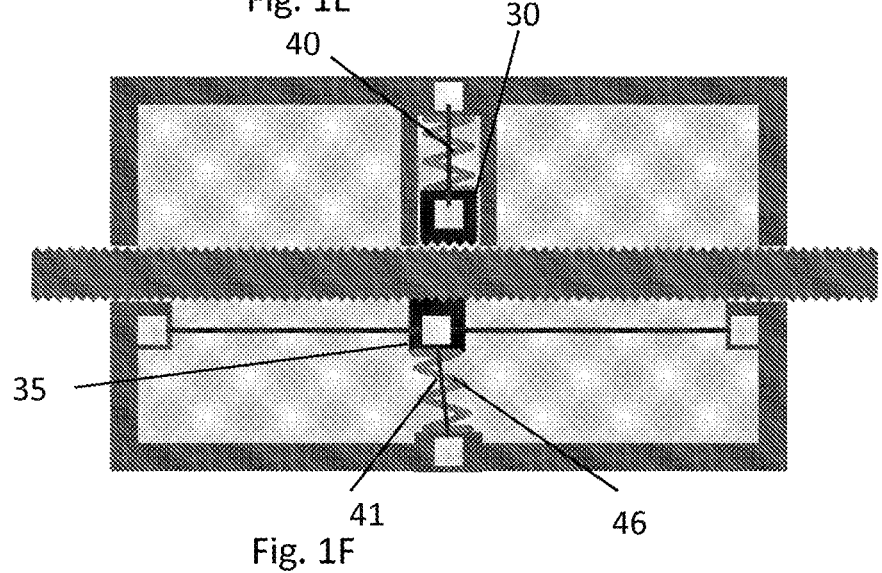

With the holding clamp 30 maintaining the position of the drive shaft 20, the drive clamp 35 is moved back parallel to the longitudinal extent of the drive shaft 20 by actuation (and thus contraction) of the opposed SMA wire 42 accompanied by relaxation of the SMA wire 43. The drive clamp 35 may be returned in this motion to its rest position, or to a position further in the opposite (left in FIG. 1) direction, as shown in FIG. 1E, to increase the stroke of each incremental motion.

Once in the return position, the perpendicular SMA wire 41 is relaxed, which causes the spring 36 to urge the drive clamp 35 back into contact with the drive shaft 20. The holding clamp 30 can then be retracted by actuator of the SMA wire 40, as shown in FIG. 1F, so that the next incremental advancement of the drive shaft 20 can start, with the process repeating the steps described above and shown in FIGS. 1B-1F until the desired extent of motion has been accomplished.

It will be appreciated that the exact extent of motion of the drive shaft 20 in the longitudinal direction can be controlled by controlling the contraction of the SMA wire 43 which is responsible for that motion. Thus, on the final incremental motion it is not necessary that the drive clamp 35 be moved to its fullest extent. In the arrangement shown in FIG. 1 where there are toothed engagement surfaces 31, 36 on the clamps 30, 35, the resolution of the final position will be determined by the size of the teeth, since the resting position has both clamps in contact with the drive shaft. However, if alternative engagement surfaces are used which do not have a toothed/other discrete engagement pattern, then the accuracy of control of the final position of the drive shaft is only limited by the accuracy of the control of the contraction of the SMA wire 43.

Whilst FIGS. 1B-1F show the drive shaft being moved in one direction (to the right in the figures), it will be appreciated that, by reversing the motion of the drive clamp 35, the drive shaft 20 can be driven in the opposite longitudinal direction (to the left in the figures) in an identical fashion. Thus the actuator assembly 1a provides for bi-directional control of the movement of the drive shaft 20.

In developments of the embodiment described above, rather than a linear engagement of the clamps 30, 35 with the drive shaft 20, the clamps may be mounted on a pivot with the SMA wire and/or spring controlling the rotation of the clamp such that at one position in the rotation of a clamp, the clamp is engaged with the outer surface of the drive shaft, whilst at another position, there is no engagement. Such an arrangement may allow for a configuration in which is more compact in the directions perpendicular to the longitudinal extent of the drive shaft 20, which may be desirable in some applications.

In further developments of the embodiments, the clamps 30, 35 may be deformable, for example due to contraction of an SMA wire, so as to engage with or disengage from the drive shaft 20. In general, any mechanism allowing the engagement portions to engage with and disengage from the movable part 20 may be used.

Further, whilst the assembly shown in FIG. 1 has four SMA wires 40-43, it will be appreciated that assemblies which have fewer SMA wires are possible which act in a very similar fashion to that described above.

For example, the holding 30 and drive 35 clamps could be driven by a single SMA wire which effectively switches between which clamp is engaged with the drive shaft 20.

Alternatively or additionally, one of the SMA wires 42, 43 which is arranged parallel to the drive shaft 20 could be replaced with a biasing element which acts against the actuation of the remaining wire and thus provides a similar force/motion to the drive clamp 35 to the removed wire. Further arrangements are also possible in which the SMA wires are not arranged perpendicular and/or parallel to the drive shaft, but operate to both drive the lateral motion of the drive clamp 35 and to engage/disengage the respective clamps. The clamps 30, 35 may be arranged to move in a predetermined pattern by engagement with slots or use of bearings which may facilitate such arrangements.

Instead of the three SMA wires 41-43, some embodiments comprise two SMA wires that are capable of engaging/disengaging the engagement portion 36 from the movable part 20 and of moving the movable part in the two directions (e.g. left and right). In such embodiments, a spring may bias the engagement portion 36 out of engagement with the movable part 20. The two SMA wires may be angled relative to the movement direction of the movable part 20, and together form a V shape, for example. On contraction of both SMA wires, the engagement portion 36 may be brought into engagement with the movable part 20. On further contraction of one SMA wire (and appropriate relaxation of the other SMA wire), the movable part 20 may be moved in one direction, and vice versa. On relaxation of both SMA wires, the spring causes the engagement portion 36 to disengage with the movable part 20, and the engagement portion 36 may be returned to its previous position.

Similarly, it will be appreciated that assemblies which have a greater number of SMA wires are also possible. For example, the springs 45, 46 could be replaced with additional SMA wires (operating in the opposite direction to the existing SMA wires against which the springs act in the assembly shown in FIG. 1), or SMA wires could be used for one or more of the wires shown in the assembly of FIG. 1, either in parallel or in series, for example to increase the available drive force on the drive clamp.

An example of a further embodiment of an actuator assembly 1b according to the present invention which uses six SMA wires is shown in FIG. 2. Compared to the assembly 1a shown in FIG. 1, the assembly 1b shown in FIG. 2 has two further SMA wires 47, 48 which are arranged to drive the movement of the clamp 30 in directions parallel to the longitudinal extent of the drive shaft 20. A pair of end-stop walls 14 are arranged to partially restrain the lateral motion of the clamps 30, 35, for example when the SMA wires are slack. Otherwise the arrangement of the assembly 1b is the same as that of assembly 1a shown in FIG. 1 and will not be described further. FIG. 2A shows the actuator assembly at rest with the clamps 30, 35 resting against the end-stop walls 14.

In this embodiment both clamps 30, 35 act as driving clamps and operate alternately to drive the motion of the drive shaft 20. An example of this driving motion is illustrated in FIGS. 2B-2E and is described further below. Although this example is shown and described for the drive shaft 20 being driven laterally to the right as shown in the figures, it will be appreciated that the motion can be readily reversed by changing the order of the steps such that drive in the opposite direction (to the left as shown in the figures) can be achieved.

Figure 2A:
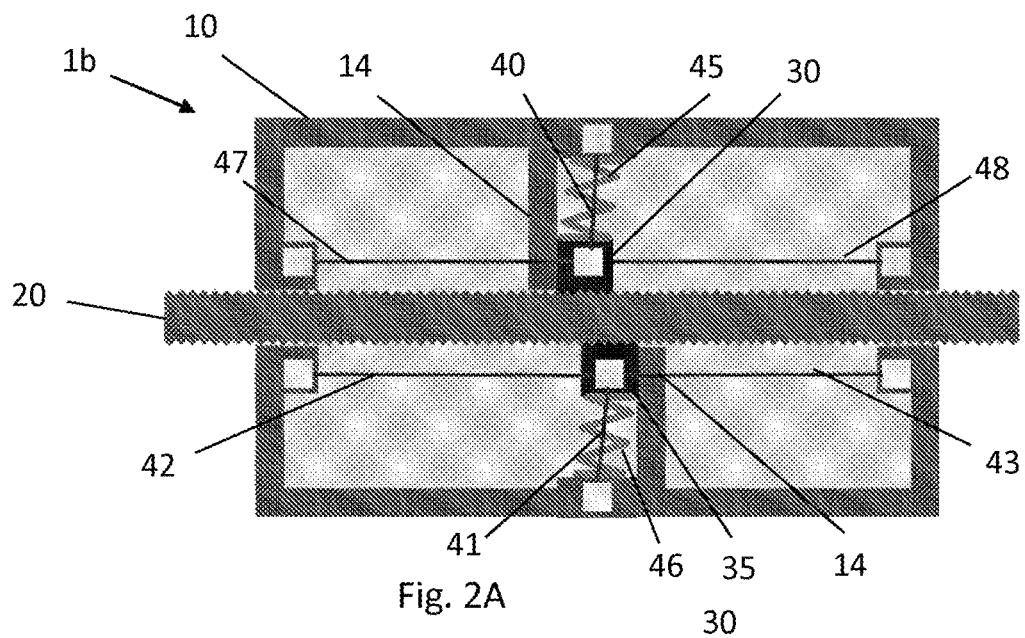
FIG. 2 shows a sequence of operation of another SMA actuator assembly according to an embodiment of the present invention.
Figure 2B:
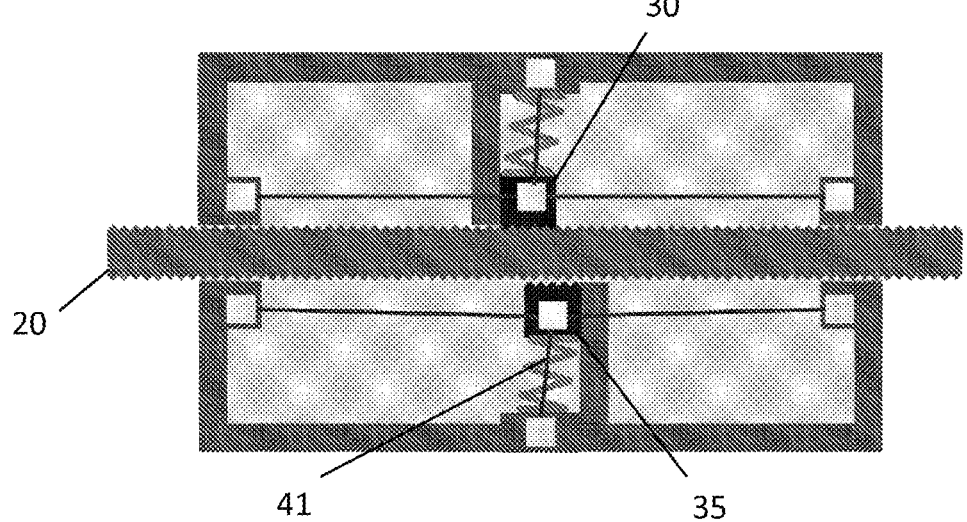

To start the motion, one of the clamps 30, 35 is retracted from the shaft by actuation of the appropriate SMA wire. For motion to the right, this is the bottom clamp 35, which is pulled away from the drive shaft 20 by contraction of SMA wire 41 as shown in FIG. 2B.

Figure 2C:
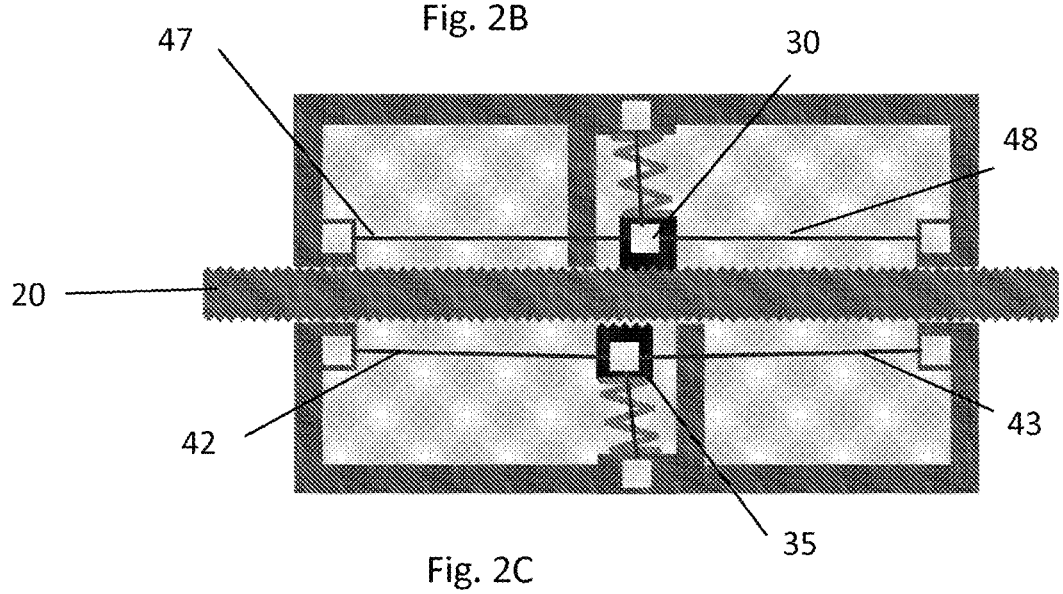

The clamp remaining in contact with the drive shaft 20, in this case upper clamp 30 is then driven in the desired direction. For motion to the right, this is achieved by actuation of SMA wire 48 causing it to contract and pull the upper clamp 30 in the desired direction as shown in FIG. 2C. Opposing SMA wire 47 may be correspondingly relaxed, or there may be sufficient slack in that SMA wire 47 to be taken up by the motion of the clamp 30. At the same time, the "free" clamp (lower clamp 35) is moved in the opposite direction to the motion of the drive shaft 20 by actuation of the SMA wire 42 (and corresponding relaxation, if appropriate/necessary, of the opposed SMA wire 43).

Figure 2D:
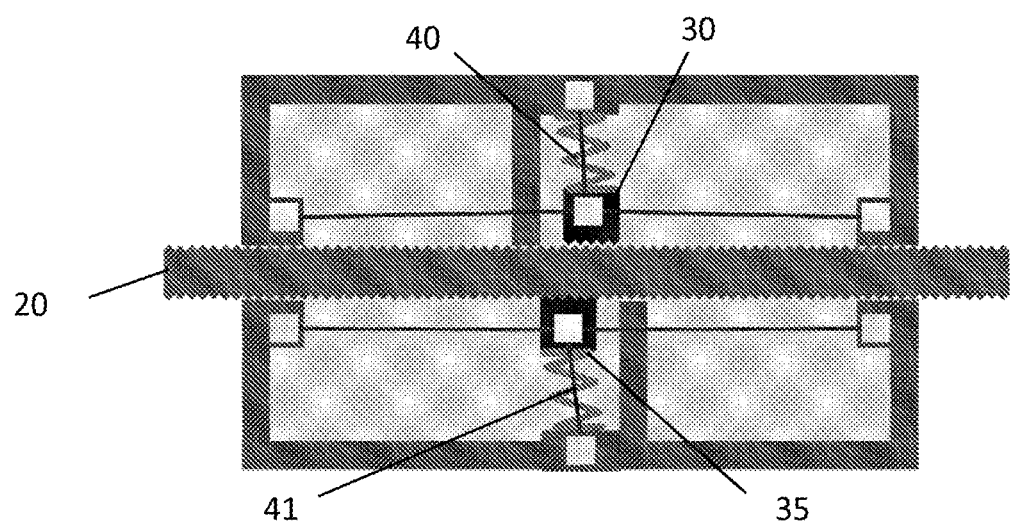

Once the limit of motion has been reached, the clamps are "switched", as shown in FIG. 2D, such that the free clamp (in this case lower clamp 35) is brought back into contact with the drive shaft 20 by relaxation of the appropriate SMA wire (in this case wire 41) whilst the previously engaged clamp (in this case upper clamp 30) is retracted from the drive shaft 20 by actuation and contraction of the corresponding SMA wire (in this case wire 40). This switching of the clamps 30, 35 may be done simultaneously or sequentially. For example this process may be carried out sequentially, thereby ensuring that the clamp 35 being brought into engagement with the drive shaft 20 is engaged before the previously-engaged clamp 30 is withdrawn, such that there is always a clamp engaged with the drive shaft and thus slip or other unwanted motion of the drive shaft can be prevented.

Figure 2E:
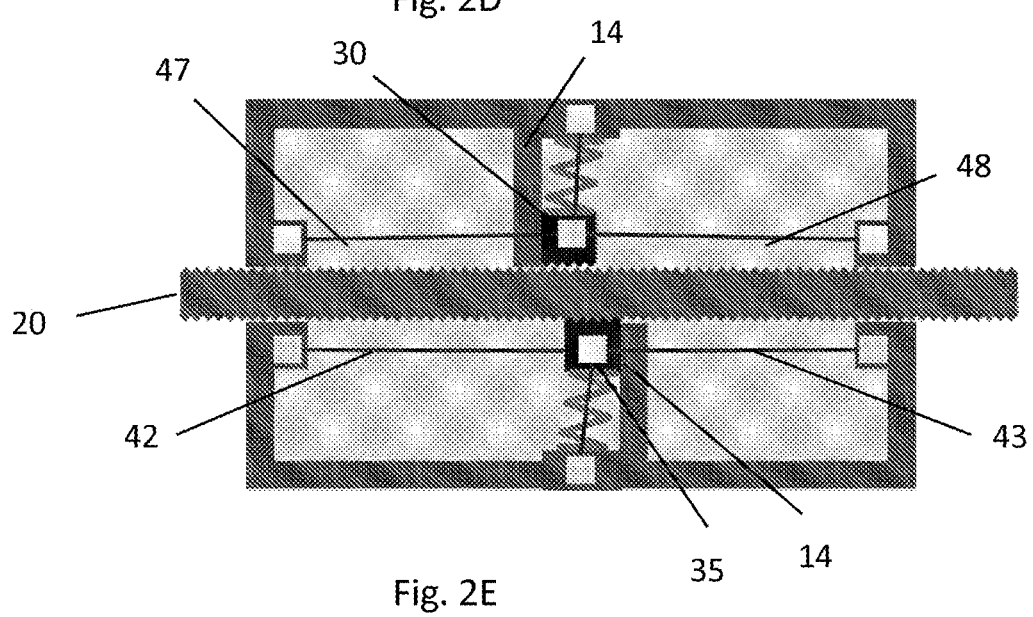
Figure 3A:
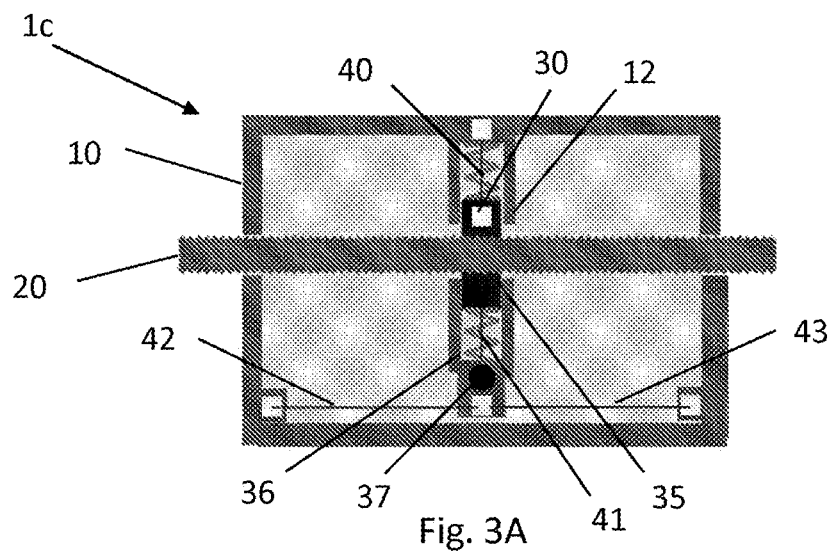
FIG. 3 shows a sequence of operation of another SMA actuator assembly according to an embodiment of the present invention.
Figure 3B:
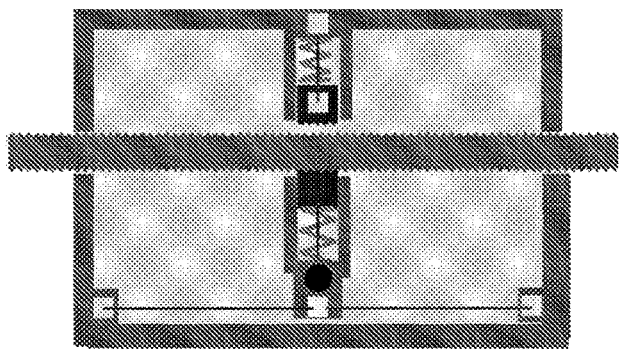
Figure 3C:
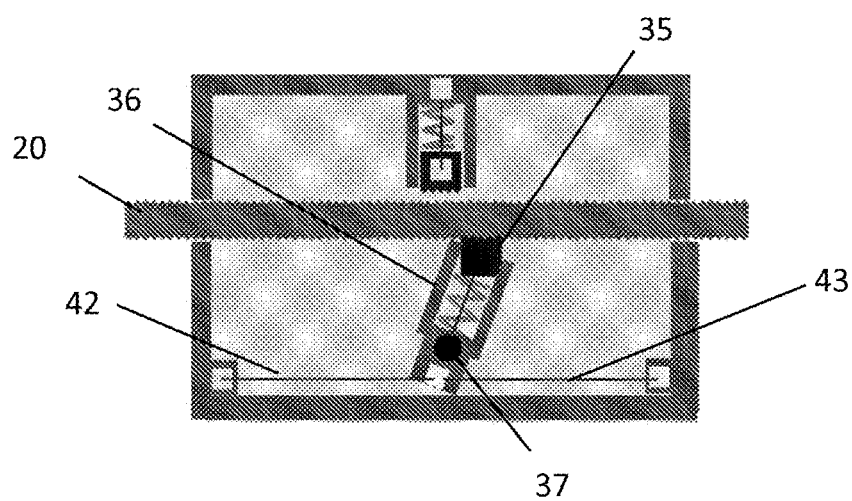
Figure 3D:
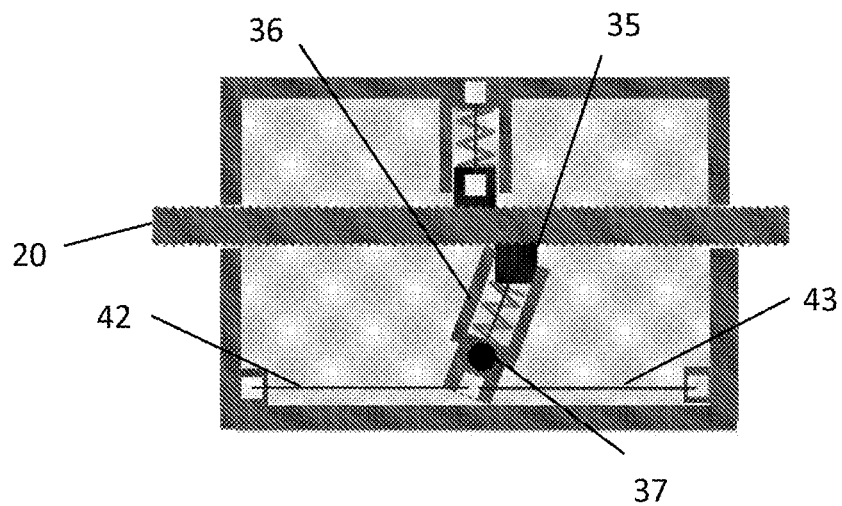
Figure 3E:
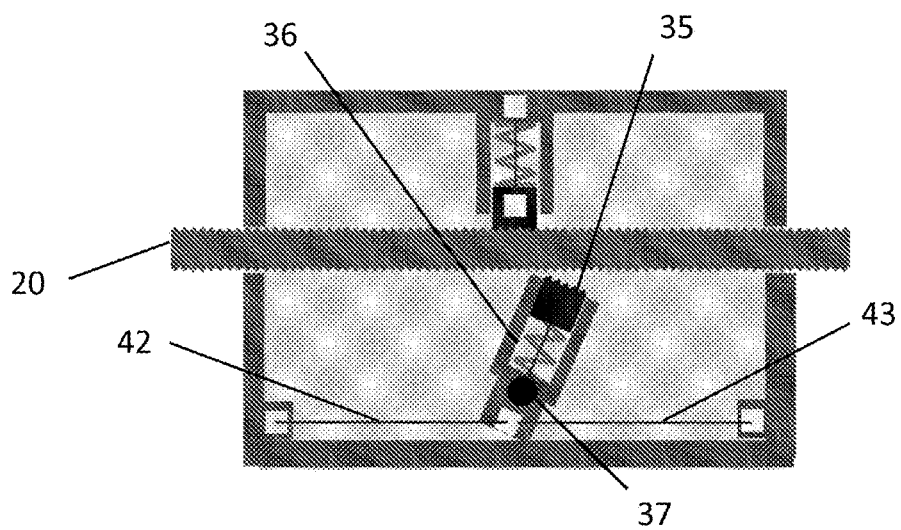
Figure 3F:
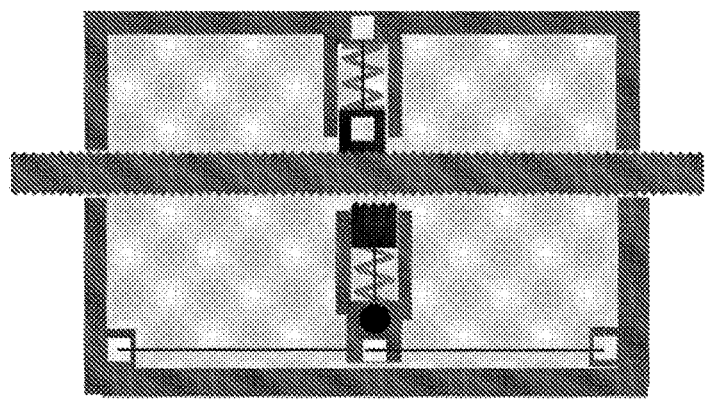

Once the clamps have been switched, the lower clamp 35 is then used to drive the lateral motion of the drive shaft 20, by contraction of the SMA wire 43 (and corresponding relaxation, if appropriate/necessary, of the opposed SMA wire 42) as shown in FIG. 2E. At the same time, the disengaged upper clamp 30 is moved back to its starting position by contraction of SMA wire 47 (and corresponding relaxation of opposed SMA wire 48). This step of the motion ends when both clamps 30, 35 return to their original horizontal positions adjacent the end-stop walls 14, as shown in FIG. 2E, at which point the engagement of the clamps can be switched again and the process repeated.

The actuator assembly 1b of this embodiment can provide for faster movement of the drive shaft 20 as the alternating drive of the two clamps allows continuous or almost continuous drive of the drive shaft. In some embodiments, the SMA wires move the engagement portions 31, 36 such that the movable part 20 moves continuously, i.e. without interruption or stopping.

As discussed in relation to the embodiment shown in FIG. 1, it will be appreciated that the actuator assembly 1b of this embodiment can also be implemented with a different number of SMA wires as desired.

FIG. 3 shows an example of a further embodiment of an actuator assembly 1c according to the present invention which is another variant on the actuator assembly 1a shown in FIG. 1. In this actuator assembly 1c, the two SMA wires 42, 43 which cause the motion of the drive clamp 35 parallel to the longitudinal extent of the drive shaft 20 are not connected directly to the drive clamp 35. Instead, the drive clamp 35 is mounted on a housing 36 which is pivoted about a pivot 37. The movable ends of the SMA wires 42, 43 are connected to the housing 36 at or near the end of the housing distal from the drive clamp 35 itself. By appropriate positioning of the pivot 37 relative to the clamp 35 and the connection of the SMA wires 42, 43 the housing and pivot can enable amplification of the stroke of the SMA wires 42, 43 thus enabling the actuator assembly 1c to achieve certain extents of motion of the drive shaft 20 faster.

FIGS. 3B-3F show the respective steps in the motion of the actuator assembly 1c of this embodiment as it drives the drive shaft 20 to the right. These steps correspond to the steps of the respective ones of the assembly 1a previously described and shown in FIGS. 1B-1F and will not be described further. However, it can be seen, particularly from FIGS. 3C-3E, how the pivoting of the housing 36 about the pivot 37 results in a greater extent of motion or stroke for the clamp 35 for a correspondingly smaller change in length of the SMA wires 42, 43.

FIG. 4 shows an example of a further embodiment of an actuator assembly 1d according to the present disclosure. In contrast to the actuator assemblies 1a-1c previously described, the actuator assembly 1d is arranged to drive rotation of a movable part in the form of rotating part. The rotating part may be a circular drive wheel 21 rather than an elongate drive shaft. However, many of the principles remain the same, as will be appreciated from the description below. Although the below refers to the circular drive 21 where, it will be appreciated that instead any other rotating part may be provided, such as a gear or a drive shaft of an SMA motor. In embodiments, the actuator assembly is an SMA motor, and the SMA wires drive rotation of the movable part in the form of a rotating part.

The actuator assembly 1d is broadly configured in the same manner as the actuator assembly 1a shown in FIG. 1. In particular, the actuator assembly 1d has an arrangement with four SMA wires 40-43 arranged to drive the motion of a drive clamp 35 and a holding clamp 30. For compatibility with the circular drive wheel 21, the arrangement of the clamps and SMA wires in the assembly 1d shown in FIG. 4 has been flipped about a horizontal axis such that the drive clamp 35 is now the upper of the two clamps in the view shown in FIG. 4.

Figure 4A:
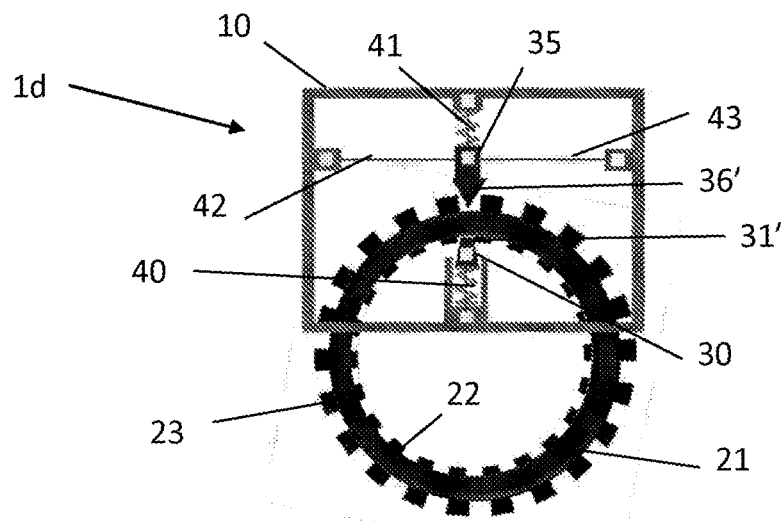
FIG. 4 shows a sequence of operation of another SMA actuator assembly according to an embodiment of the present invention.

In the embodiment shown in FIG. 4, the engagement portions 31', 36' of the clamps 30, 35 are triangular (or partially triangular, such as the engagement portion 31' of the holding clamp 30 shown in the rest position of FIG. 4A in which both engagement portions 31', 36' are slotted into gaps between the inner teeth 22 and the outer teeth 23 of the drive wheel 21 to secure the position of the drive wheel) when viewed from the side. This configuration allows the engagement portions 31', 36' to engage with the teeth 22, 23 on the drive wheel 21 even if there is a slight misalignment of the clamp and the gap between two teeth 22, 23. However, in general, any of the engagement portions described in relation to the embodiments of FIGS. 1-3 may be provided.

The operation of the actuator assembly 1d is broadly as set out above for the actuator assembly 1a and is illustrated in FIGS. 4B-4F.

Figure 4B:
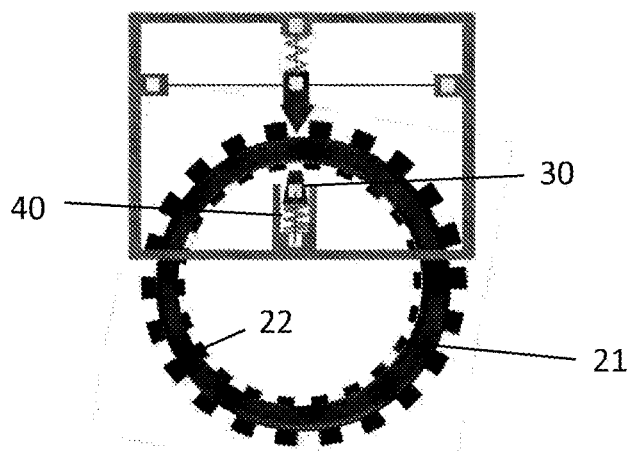
Figure 4C:
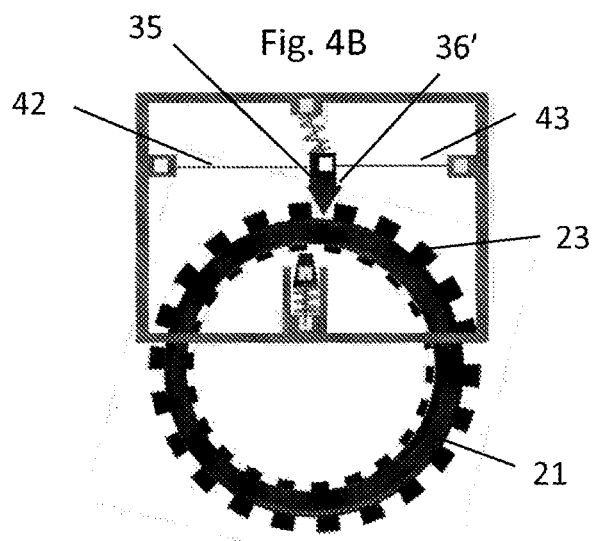

Firstly, as shown in FIG. 4B, the holding clamp 30 is disengaged from the inner teeth 22 of the drive wheel 21 by actuation and contraction of the SMA wire 40. Then the drive clamp 35 is driven laterally (in this case to the right as shown in FIG. 4C) by actuation and contraction of the SMA wire 43. The resulting tangential force between the engagement portion 36' and the outer teeth 23 causes the drive wheel 21 to rotate clockwise.

Figure 4D:
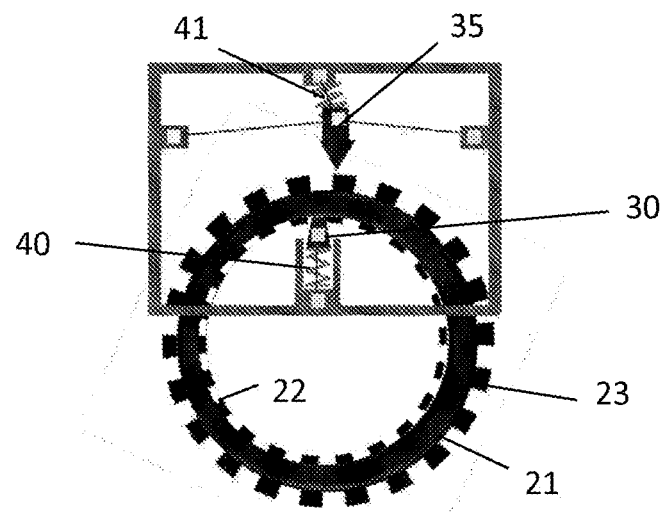

When the limit of lateral motion of the drive clamp 35 is reached, the holding clamp 30 is re-engaged with the inner teeth 22 of the drive wheel 21 by relaxation of the SMA wire 40, so as to maintain the positioning of the drive wheel 22. The drive clamp 35 is then disengaged from the outer teeth 23 by actuation of the SMA wire 41, as shown in FIG. 4D. It will be appreciated that this engagement/disengagement step may be performed simultaneously or sequentially.

Figure 4E:
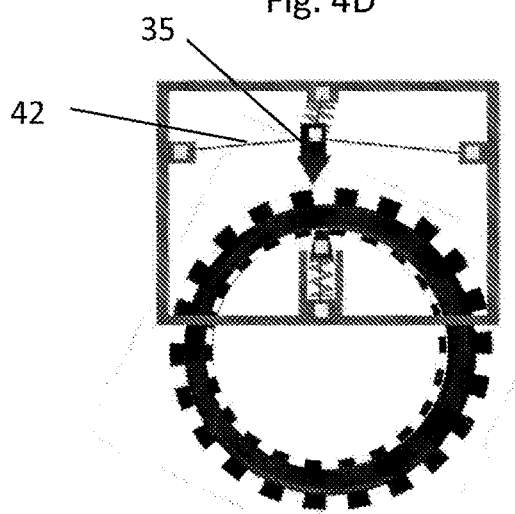
Figure 4F:
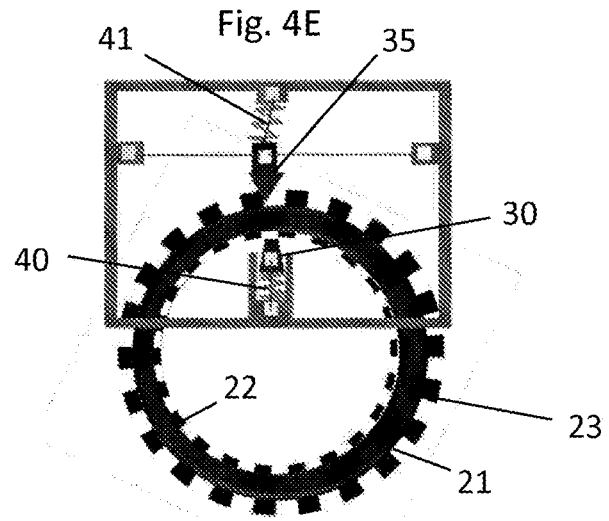

The drive clamp 35 is then moved back to the left by actuation of the SMA wire 42 as shown in FIG. 4E before re-engagement with the outer teeth 23 by relaxation of SMA wire 41. The holding clamp 30 is then disengaged from the inner teeth 22, as shown in FIG. 4F, so that the driving process can be repeated.

As with the actuator assemblies previously described which provide for a linear drive motion, the actuator assembly 1d shown in FIG. 4 may be modified by using different numbers of SMA wires and/or further biasing elements and/or pivoting housings. These modifications are not described in detail here as they will apparent from the description of such arrangements in relation to the linear drive assemblies above. As previously discussed, the holding clamp 30 and associated featured may be omitted in some embodiments. The holding clamp 30 need not be located within the drive wheel, but may be located at any position external to the diameter of the drive wheel.

Figure 5:
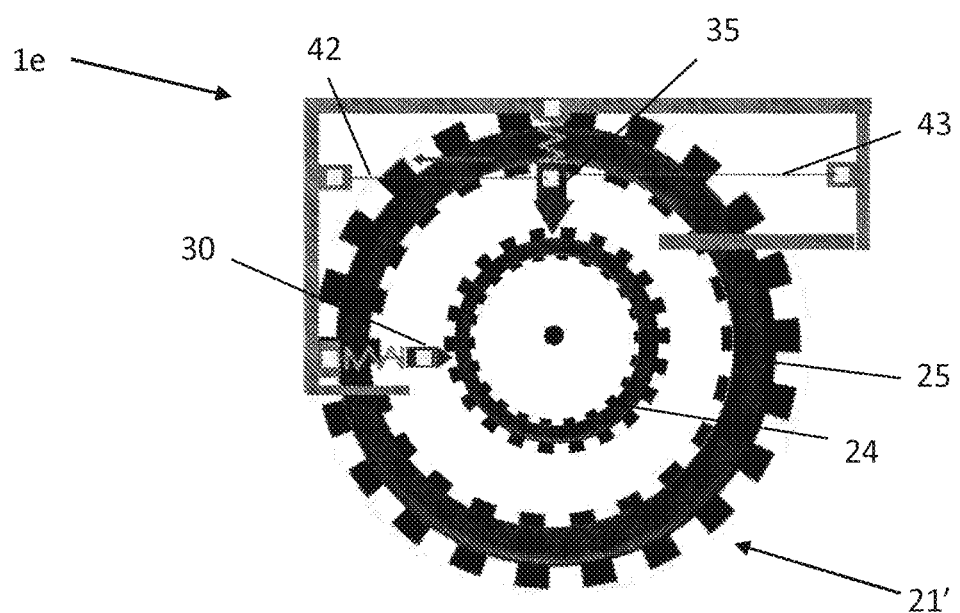
FIG. 5 shows another SMA actuator assembly according to an embodiment of the present invention.

FIG. 5 shows an actuator assembly 1e according to a further embodiment of the present disclosure for rotational drive. This actuator assembly is, in the most part, identical to that shown in FIG. 4 and described above. However, in the assembly 1e shown in FIG. 5, the drive wheel 21' has a compound gear-type structure in which a smaller diameter toothed inner wheel 24 is attached to a larger diameter toothed outer wheel 25. The clamps 30, 35 engage with the teeth on the inner wheel 24 and the difference in diameters between the inner wheel 24 and the outer wheel 25 serves to amplify the distance moved by the each incremental step of the actuator assembly.

It will also be noted that, in the actuator assembly 1e shown in FIG. 5, the holding clamp 30 and the drive clamp 35 are not opposed to each other but rather operate on the same set of teeth at different points around the outer circumference of the inner wheel 24. Although in the actuator assembly 1e shown in FIG. 5, the clamps 30, 35 are separated by 90 degrees, it will be clear that different configurations with different separations are also possible.

Furthermore, it will be appreciated that the two engagement portions and the SMA wire arrangement of FIG. 2 may be combined with the rotating part of FIG. 4 or 5. In such embodiments, the SMA actuator assembly may be a continuous drive motor. The SMA wires may move the engagement portions in a manner enabling continuous rotation of the rotating part.

Similarly, the SMA wire arrangement and mechanism of FIG. 3 may be used with the rotating part of FIG. 4 or 5.

Similarly, whilst the above-described embodiments of actuator assemblies for linear drive motion all showed the two clamps 30, 35 positioned directly opposite each other on opposite sides of the drive shaft 20 and engaging with opposite sides of the drive shaft 20, it will be appreciated that alternative arrangements are possible in which the clamps are arranged on and engage with the same side of the drive shaft 20, or are positioned such that they are at the same linear position when viewed from the side of the assembly as in FIGS. 1-3, but are angularly displaced from each other when viewed along the longitudinal axis of the drive shaft 20.

The choice of the location and arrangement of the clamps and SMA wires within these assemblies may be made bearing in mind the physical constraints of the device into which the assembly is incorporated, which may require that the actuators are all located on one side of the driven element.

As with the actuator assemblies previously described the actuator assembly 1e shown in FIG. 5 may be modified by using different numbers of SMA wires and/or further biasing elements and/or pivoting housings. These modifications are not described in detail here as they will apparent from the description of such arrangements in relation to the linear drive assemblies above.

One particular application of the actuator assemblies according to embodiments of the present disclosure is in the control of an iris of a miniature camera. The mechanisms for operating an iris generally require greater stroke than is possible for a single SMA wire. The incremental drive of the actuator assemblies according to embodiments of the present disclosure may therefore be used to "amplify" the available stroke by repeated application of a shorter stroke.

FIGS. 6-9 show particular applications of the actuator assemblies, including some of the above-described actuator assemblies, to the operation of an iris. Where details of the actuator assemblies have already been described they are not repeated below. It will also be appreciated that, whilst these examples show how an iris drive mechanism may be driven by the actuator assemblies described, they can be readily adapted to other drive mechanisms which receive a linear or circular drive input, in particular those described in the above embodiments.

FIG. 6 shows an actuator assembly 1f according to a further embodiment of the present disclosure arranged to drive an iris mechanism 50. This actuator assembly 1f is very similar to the actuator assembly 1a previously described and illustrated in FIG. 1. However, the actuator assembly 1f has a single clamp 35 and therefore only has three SMA wires 41-43 which control the motion of that clamp 35 (in conjunction with a compression spring 46).

The clamp 35 operates like the drive clamp of the actuator assembly previously described. No holding clamp is used in the actuator assembly 1f of this embodiment. The holding clamp can be omitted when the likely forces on the drive shaft 20 when the clamp 35 is disengaged expected to be sufficiently small that they will not overcome the friction on the drive shaft 20 and/or are so small relative to the mass of the drive shaft that they are unlikely to cause motion of the drive shaft within the time frame in which the clamp 35 is disengaged from the drive shaft 20.

The iris mechanism 50 includes an iris leaver 51 which engages with a sloping end surface 27 to the drive shaft 20. The sloping end surface 27 translates the linear motion of the drive shaft 20 in opposed directions along its longitudinal extent into linear motion in directions perpendicular to those directions. Appropriate choice of the inclination of the end surface can be used to either amplify the motion (such that, for a given amount of movement of the drive shaft 20, the end of the iris leaver 51 in contact with the end surface 27 moves by a larger amount), or conversely to provide mechanical advantage such that a greater force can be exerted on the iris mechanism 50.

Figure 6A:
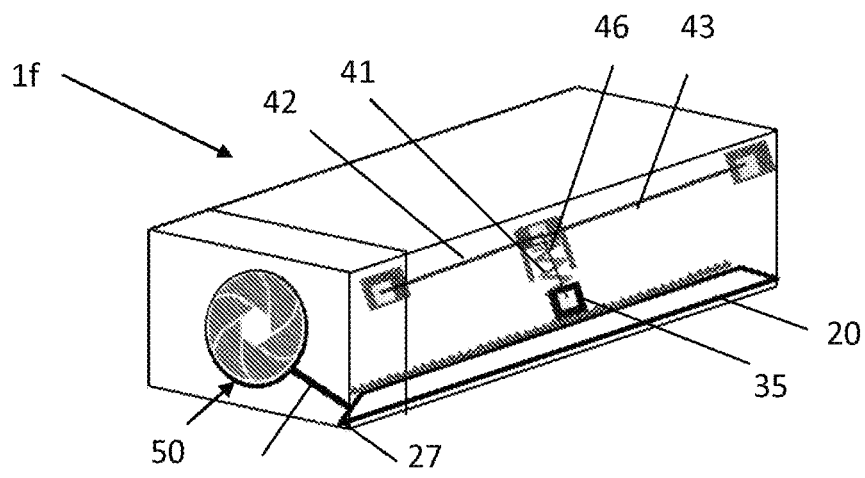
FIG. 6 shows a sequence of operation of another SMA actuator assembly according to an embodiment of the present invention as used to operate an iris.

In the rest position, as shown in FIG. 6A, the clamp 35 is engaged with the drive shaft and maintained there by compression spring 46, with the SMA wires 41-43 not actuated.

Figure 6B:
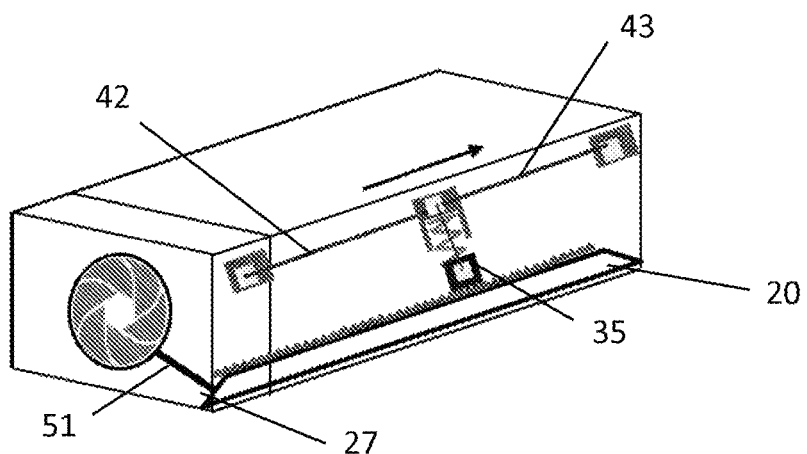

The actuator 1f drives the motion of the drive shaft 20 as illustrated in FIGS. 6B-6E. Firstly, SMA wire 43 is actuated and contracts, driving the clamp 35 to the right as shown in FIG. 6B. The toothed contact between the clamp 35 and the drive shaft 20 causes the drive shaft 20 to move in the same direction. As before, a friction clamp could be used instead of the toothed arrangement shown.

Figure 6C:
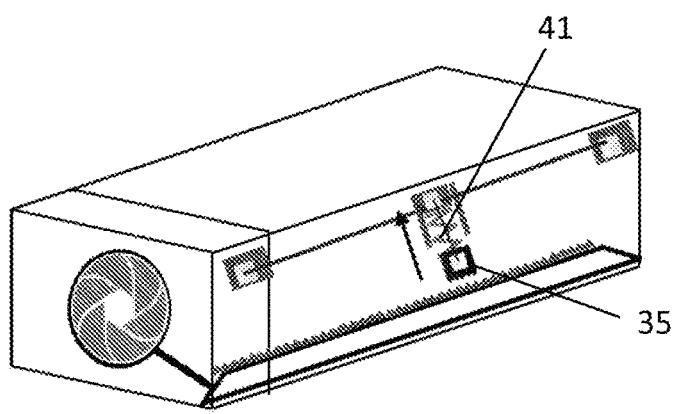
Figure 6D:
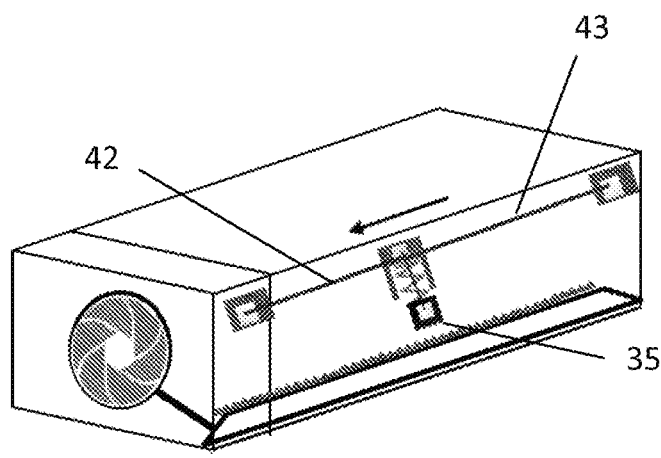
Figure 6E:
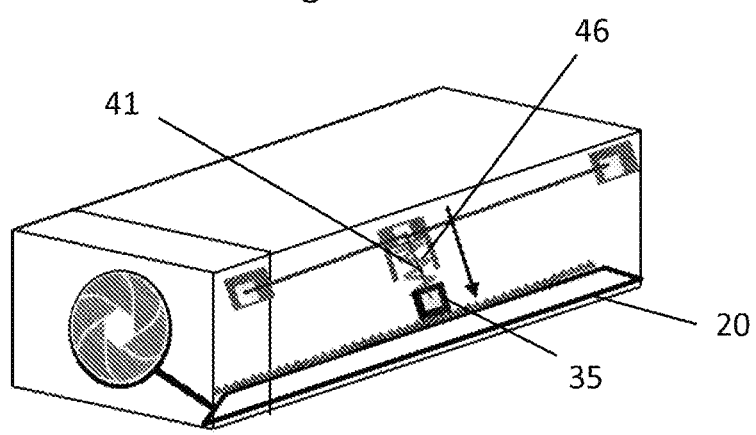

When the extent of motion has been reached, the clamp 35 is disengaged from the drive shaft 20 by actuation and contraction of the SMA wire 41 as shown in FIG. 6C. The clamp 35 is then moved back to the left by actuation and contraction of SMA wire 42 (and corresponding relaxation of SMA wire 43), as shown in FIG. 6D. Finally, the clamp 35 is brought back into engagement with the drive shaft by relaxation of the SMA wire 41, which allows the compression spring 46 to urge the clamp 35 back into contact with the drive shaft 20 as shown in FIG. 6E and the motion can be repeated.

FIG. 7 shows an actuator assembly 1g according to a further embodiment of the present disclosure arranged to drive an iris mechanism 50. This actuator assembly 1g is very similar to the actuator assembly 1d previously described and illustrated in FIG. 4. However, as with the actuator assembly 1f described above and shown in FIG. 6, the actuator assembly 1g has a single clamp 35 and therefore only has three SMA wires 41-43 which control the motion of that clamp 35 (in conjunction with a compression spring 46).

In the actuator assembly 1g shown in FIG. 7, the iris mechanism 50, which is a leaved iris, is mounted within the drive wheel 21, such that rotation of the drive wheel 21 causes the iris to open or close, depending on the direction of the rotation.

Figure 7A:
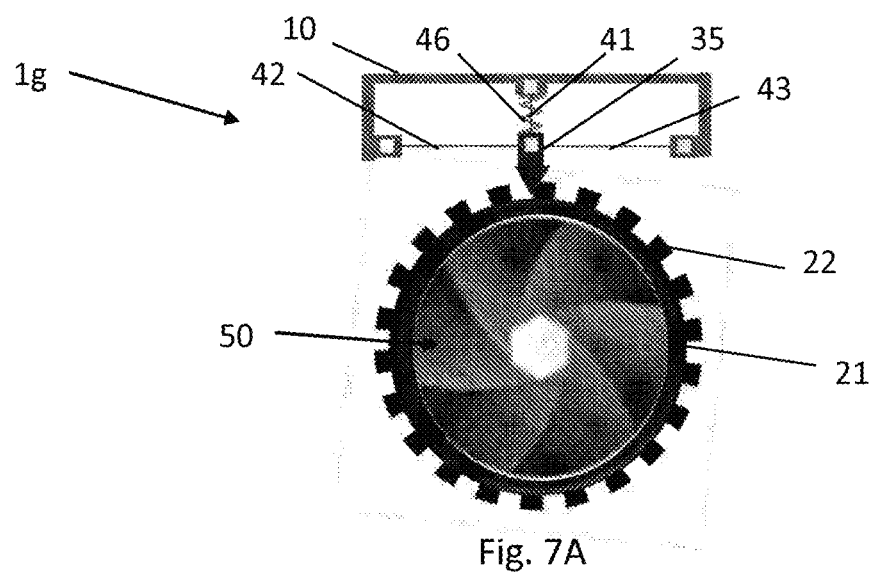
FIG. 7 shows a sequence of operation of another SMA actuator assembly according to an embodiment of the present invention as used to operate an iris.

FIG. 7A shows the actuator assembly 1g in a rest position with the clamp 35 engaged with the teeth of the drive wheel 21. FIGS. 7B-7F show the steps in the drive process to cause the iris mechanism 50 to open the iris.

Figure 7B:
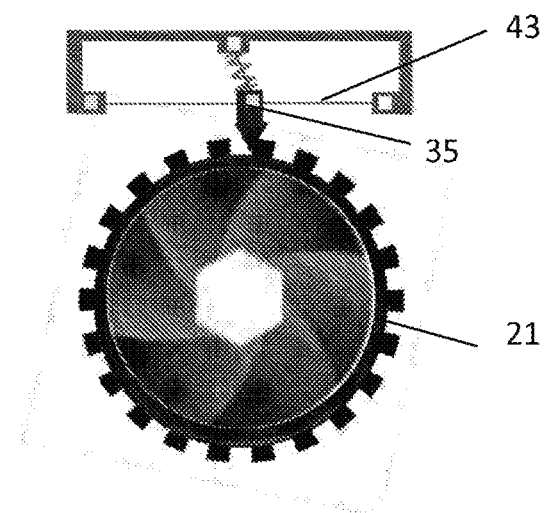

The clamp 35 is initially driven to the right by actuation and contraction of SMA wire 43. This causes the drive wheel 21 to rotate clockwise which results in partial opening of the iris as shown in FIG. 7B.

Figure 7C:
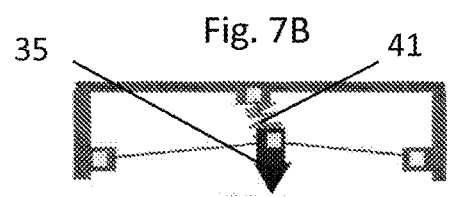
Figure 7C:
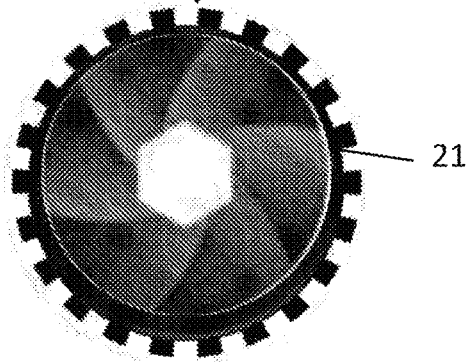

When the extent of linear motion drivable by SMA wire 43 is reached, the clamp 35 is disengaged from the teeth 22 of the drive wheel by actuation of and contraction of SMA wire 41, as shown in FIG. 7C.

Figure 7D:
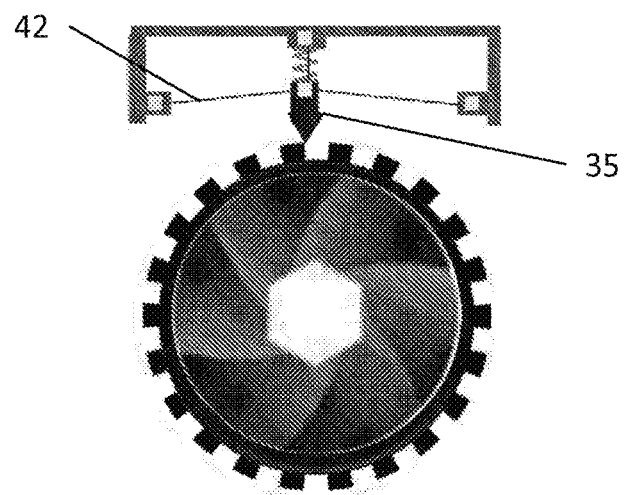
Figure 7E:
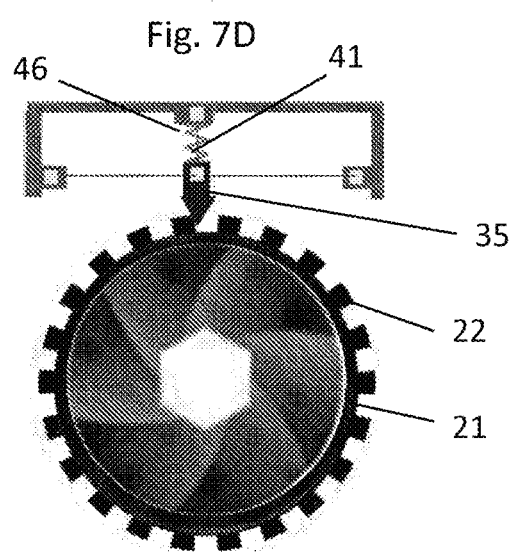
Figure 7F:
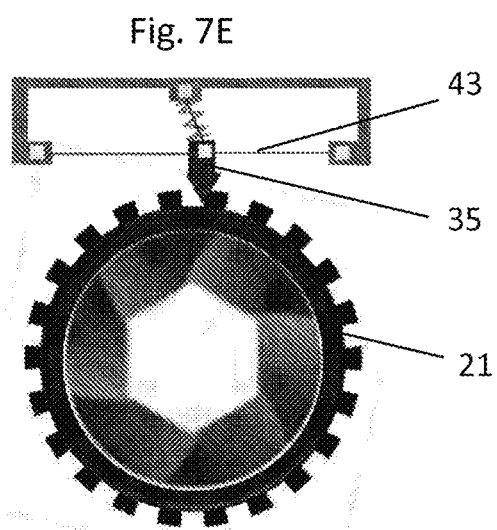

The clamp 35 is then moved back to a position to the left of its rest position by actuation of and contraction of SMA wire 42 as shown in FIG. 7D. This means that when SMA wire 41 is relaxed, the compression spring 46 urges the clamp 35 back into contact with the drive wheel 21 at a position which is one (or more) tooth anti-clockwise on the drive wheel, as shown in FIG. 7E. The drive process can then be repeated starting with the step of driving to the right, which results in further opening of the iris as shown in FIG. 7F.

Figure 8:
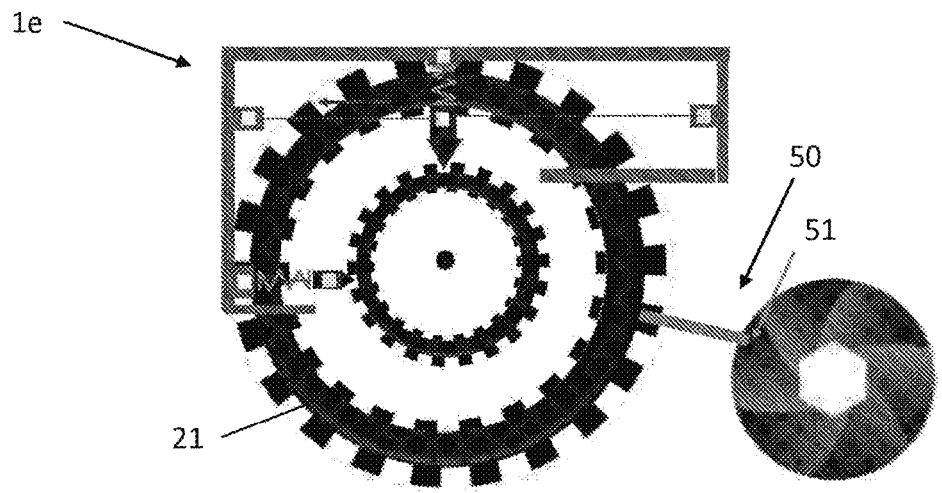
FIG. 8 shows another SMA actuator assembly according to an embodiment of the present invention arranged to operate an iris.

FIG. 8 shows the use of an actuator assembly 1e as described above in relation to FIG. 5 to drive an iris mechanism 50 which is operated by an iris leaver 51. The iris leaver 51 may be connected to the drive wheel 21 in an offset arrangement as shown in FIG. 8, or mounted co-axially with the drive wheel 21.

Figure 9:
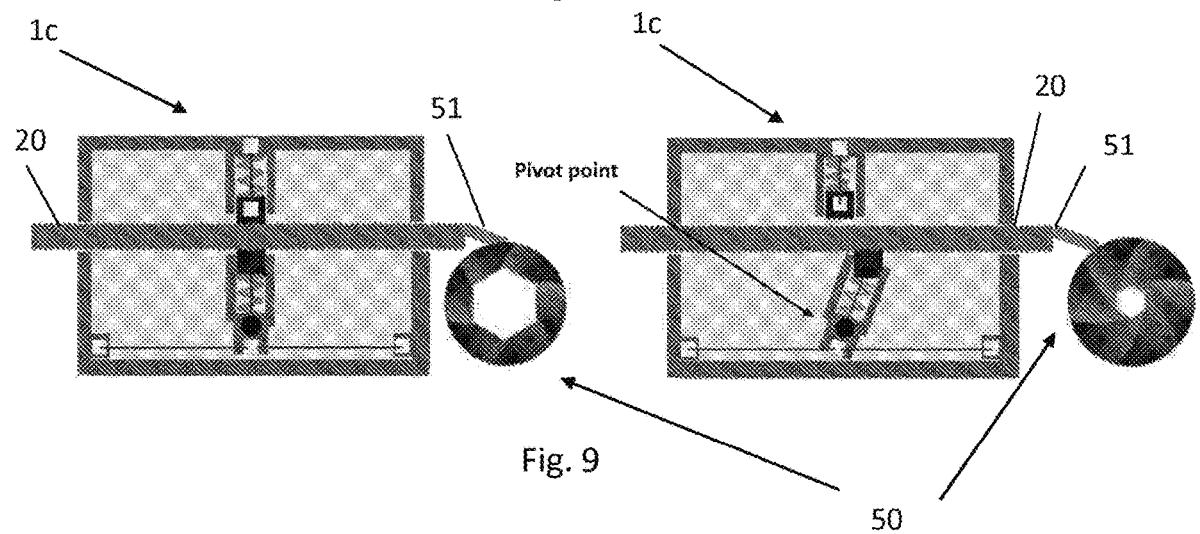
FIG. 9 shows another SMA actuator assembly according to an embodiment of the present invention arranged to operate an iris.

FIG. 9 shows the use of an actuator assembly 1c as described above in relation to FIG. 3 to drive an iris mechanism 50 through connection between the drive shaft 20 and the iris leaver 51. FIG. 9 shows the iris mechanism 50 in an open state on the left-hand side and in a closed state on the right-hand side. However, it will be appreciated that, between those two states, several iterations of the drive process described above in relation to FIG. 3 may have taken place.

Figure 10A:
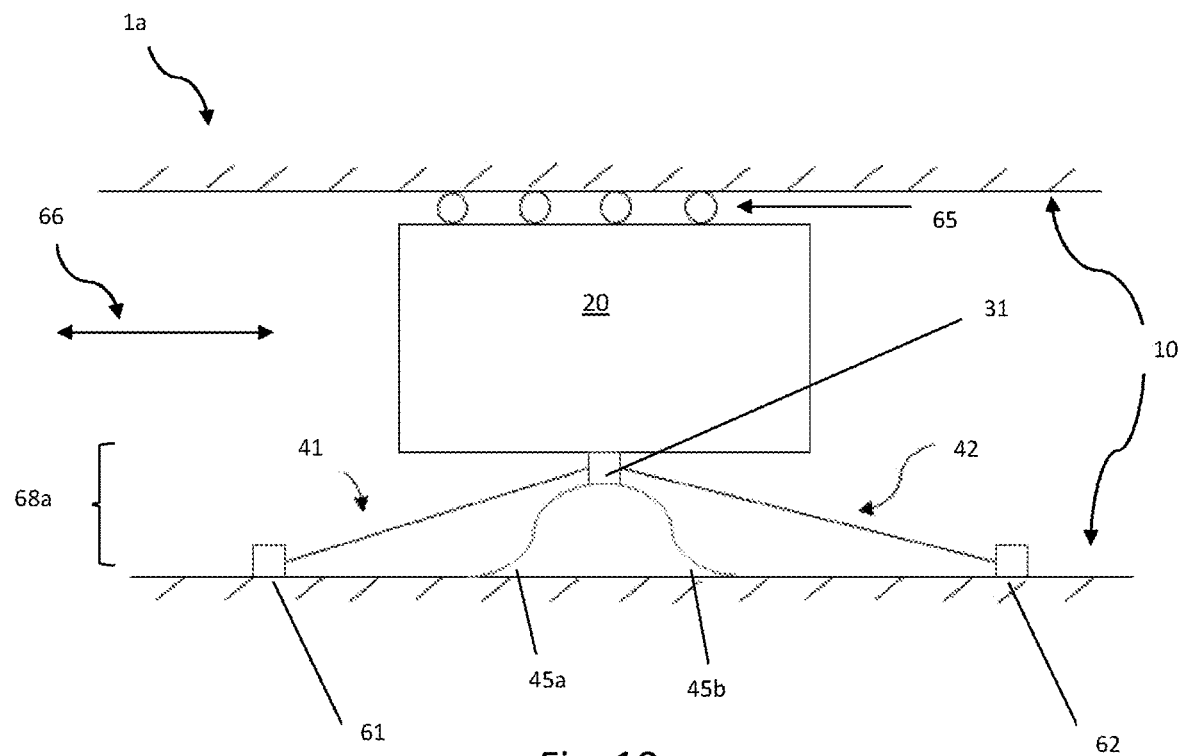
FIG. 10a shows another SMA actuator assembly according to an embodiment of the present invention.
Figure 10B:
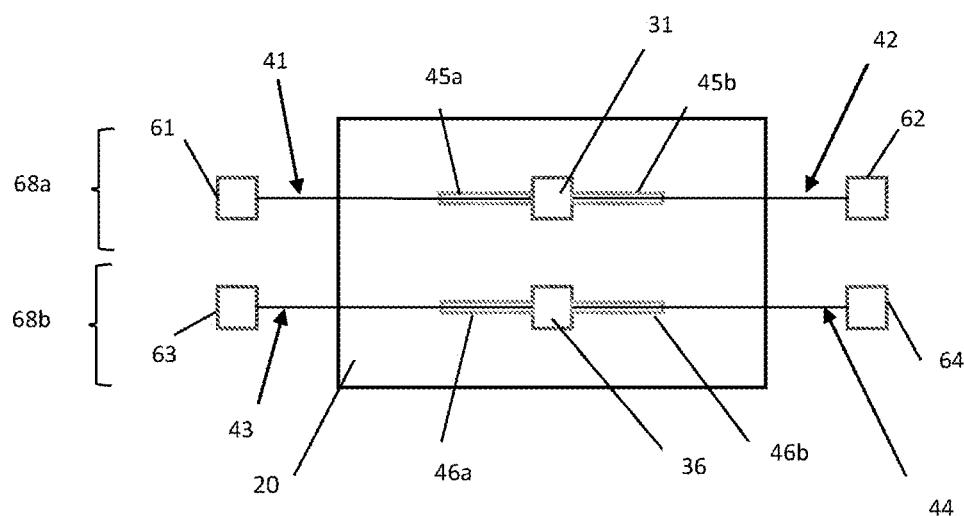

A further embodiment is described with reference to FIGS. 10a-g. FIG. 10a shows an SMA actuator assembly 1a according to a further embodiment. The actuator assembly comprises two actuator units 68a and 68b. FIG. 10a shows a side view of the actuator assembly 1a and hence only shows the first actuator unit 68a. FIG. 10b shows a view of the underside of the actuator assembly 10a and shows both actuator units 68*a* and 68*b*, placed side by side. It will be appreciated that the actuator units may be arranged in any configuration (e.g. disposed next to each-other along the direction 66, as shown in FIG. 12*b*).

With reference to FIG. 10*a*, the actuator assembly 1*a* has a fixed support structure 10 and is arranged to progressively drive a movable part 20 in a linear fashion (i.e. in the horizontal direction in the figures, indicated by arrow 66). The movable part 20 is supported on the support structure 10 in a manner allowing translational movement of the movable part 20 relative to the support structure 10. In particular, the movable part 20 is supported on a bearing arrangement 65, which comprises rollers or ball bearings. It will be appreciated that other bearing arrangements, such as planar bearings, may be used. In the depicted embodiment, the movable part 20 is a lens carriage 20, comprising one or more lenses, but it will be appreciated that any other movable part 20 may generally be provided. In the case that the movable part is a lens carriage, direction 66 may correspond to the optical axis of the one or more lenses.

The actuator assembly 1*a* comprises first and second SMA wires 41 and 42. The first SMA wire 41 is connected between an engagement portion 31 and a first static crimp 61. The first static crimp 61 is connected to the support structure 10 and remains stationary relative to the support structure 10. The second SMA wire 42 is connected between the engagement portion 31 and a second static crimp 62, which is also connected to the support structure 10 and remains stationary relative to the support structure.

In use, the engagement portion 31 selectively engages the movable part 20. The engagement portion 31 is a crimp, to which SMA wires 41 and 42 are connected (both mechanically and electrically), but it will be appreciated that the engagement portion 31 may generally be provided in any other appropriate shape or form.

The engagement portion 31 engages with an outer surface of the movable part 20. The engagement portion 31 has a textured surface with a relatively high coefficient of friction in order to transfer a lateral force to the movable part 20. In some embodiments, the engagement portion 31 may be toothed and may engage with a corresponding toothed (or helical) arrangement on the outer surface of the movable part 20. The engagement portion 31 may equally have other configurations which are suitable for transferring a lateral force between the engagement portion 31 and the movable part 20.

The actuator assembly 1*a* further comprises biasing elements 45*a* and 45*b*. These biasing elements act to bias the engagement portion 31 upwards (in the view shown in FIG. 10*a*). The upper ends of the biasing elements 45*a* and 46*b* are connected to the engagement portion 31 and the lower ends are in sliding contact with the support structure 10, such that when the engagement portion 31 moves laterally (along direction 66) the biasing elements also move laterally with it, relative to the support structure 10.

As shown in FIG. 10*b*, the actuator assembly 1*a* comprises two actuator units 68*a* and 68*b* disposed alongside each-other. The two actuator units have the same structure and operate in the same way. Operation of one of the actuator units will now be described with reference to FIGS. 10*c* to 10*f*. Reference numerals are provided in FIG. 10*c* only in the interest of clarity but it will be appreciated that they apply to each of FIGS. 10*d* to 10*f*.

Figure 10C:
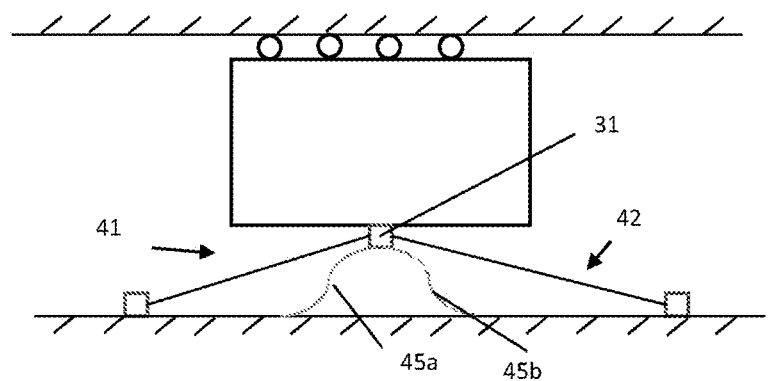
FIGS. 10c to 10f show a sequence of operation of the actuator assembly of FIGS. 10a and 10b.

The actuator unit 68*a* operates in a cyclic manner and operation of the actuator unit will be described beginning at a point at which the first and second SMA wires are powered off. In this state, the force of biasing elements 45*a* and 45*b* is not opposed by the SMA wires and so the engagement portion 31 is in contact with the movable part 20, as shown in FIG. 10*c*.

Figure 10D:
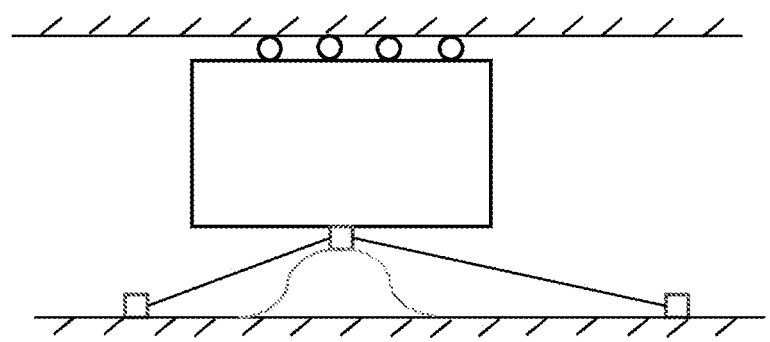

The first SMA wire 41 is then powered on and contracts. Power to the first SMA wire is controlled so as not to overcome the upwards force of biasing elements 45*a* and 45*b* so that contact is maintained between the engagement portion 31 and the movable part 20. Friction between the engagement portion 31 and the movable part means that the movable part moves to the left (as shown in FIG. 10*d*).

Figure 10E:
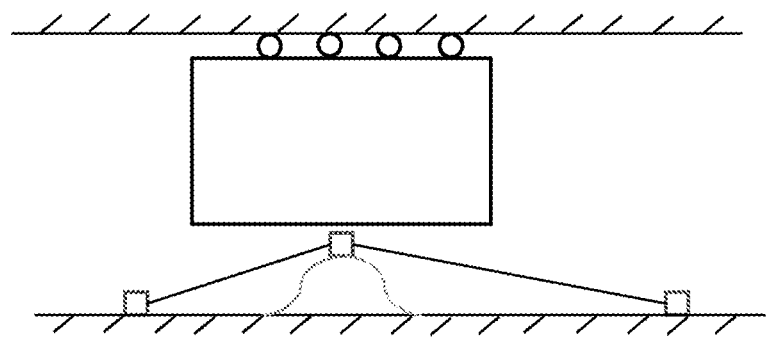

The second SMA wire 42 is then powered on and contracts. Both SMA wires are now contracted and the force of the biasing elements 45*a* and 45*b* is overcome. The biasing elements are deflected in a downwards direction and so the engagement portion 31 disengages the movable part. This is shown in FIG. 10*e*.

Figure 10F:
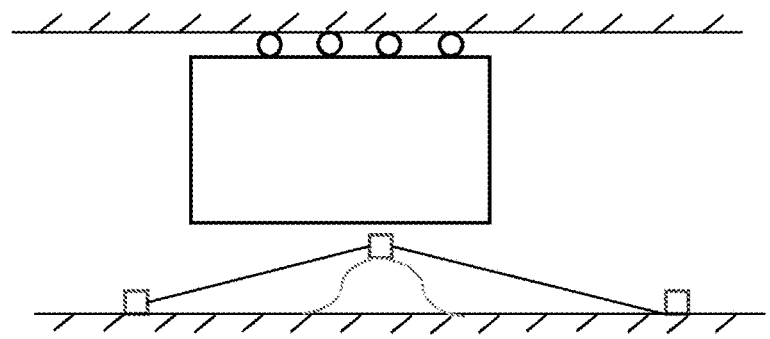

The power to the first SMA wire 41 is then reduced and the power to the second SMA wire 42 is increased, which shifts the engagement portion 31 to the right (as in FIG. 10*f*). During this shift, the engagement portion is still disengaged from the movable part 20. The biasing elements 45*a* and 45*b* are in sliding contact with the support structure 10 so the biasing elements move with the engagement portion 31 to the right. This is shown in FIG. 10*f*.

The power to both wires is reduced (or removed) so that the force of the biasing elements 45*a* and 45*b* moves the engagement portion 31 back into engagement with the movable part 20.

The power to the second SMA wire 42 is then reduced and the power to the first SMA wire 41 is increased, which causes the engagement portion 31 (and hence the movable part 20) to move left again.

This cycle is then repeated to incrementally move the movable part 20 along. It will be apparent that the direction of movement could also be reversed in order to move the movable part 20 to the right.

Another way to view this cycle is that it consists of two motions:
- a low power motion where the average of the power applied to the first and second SMA wires is lower and the engagement portion 31 is engaged with the movable part 20 and
- a high power motion where the average of the power applied to the first and second SMA wires is higher and the engagement portion is not engaged with the movable part 20.

Within each motion the engagement portion 31 is moved left or right by adjusting the relative power applied to each of the first and second SMA wires.

In this way, the first actuator unit 68*a* acts to incrementally move the movable part 20 along direction 66. The second actuator unit 68*b* acts in the same way as the first actuator unit, but the two actuators units 68*a* and 68*b* act out of phase with one another. Accordingly, when the engagement portion 31 (of the first actuator unit) is disengaged from the movable part 20, the engagement portion 36 (of the second actuator unit 68*b*) is engaged with the movable part 20 and acts to move it along the movement direction. In this way, at any given time one of the actuator units is acting to move the movable part 20 along and the other is resetting its position in order to perform another incremental movement. This could be compared to a walking motion.

As described above, the biasing elements 45*a* and 45*b* act to bias the engagement portion 31 into engagement with the movable part 20. This has the advantage that when the SMA wires 41 and 42 are powered off, the engagement portion 31 is engaged with the movable part and acts to prevent movement of the movable part 20 along the direction of movement (labelled 66 in FIG. 10a) when the SMA is in an unpowered state. However, it will be appreciated that the biasing elements could equally be arranged to bias the engagement portion 31 into a state in which it is disengaged from the movable part 20 and the SMA wires 41 and 42 could be arranged to, on contraction, bring the engagement portion 31 into engagement with the movable part 20. However, an additional holding arrangement may be required in this case in order to prevent movement of the movable part when the SMA wires are powered off. This could be a holding element, for example, which provides a constant source of friction to the movable part. The friction between the movable part and the holding element would need to be high enough to prevent movement of the movable part when the wires are unpowered but low enough that it could be overcome by the contraction of the SMA in order to move the movable part.

A further advantage of the actuator assembly 1a as described with reference to FIGS. 10a and 10b is that it is simple to manufacture. Specifically, the engagement portion 31 (which itself is a crimp), the static crimps 61 and 62, and the biasing elements 45a and 45b may be formed from a single etching, to which the first and second SMA wires 41 and 42 are attached to form the first actuator unit 68a. The second actuator unit 68b may be formed in the same way (i.e. from a single etching). The actuator units are then connected (mechanically and electrically) between the support structure 10 and the movable part 20. Equally, both the actuator units 68a and 68b could be formed from the same etching and a connection between the respective engagement portions 31 (otherwise referred to as the first engagement portion and the second engagement portions respectively) could be provided in order to provide an electrical connection.

Figure 10G:
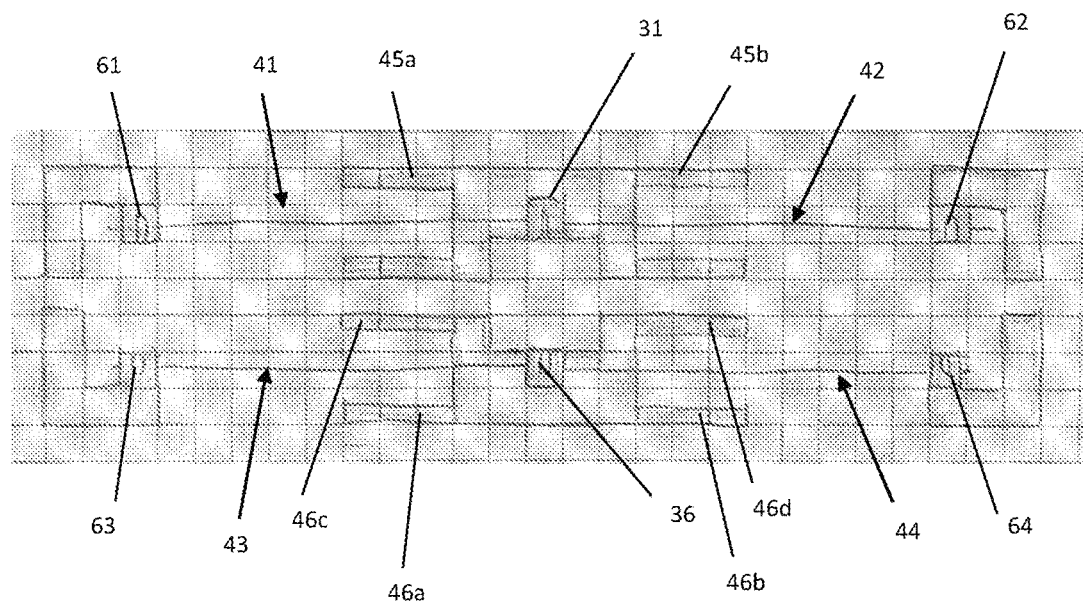
FIG. 10g shows an SMA actuator assembly according to an embodiment.

Such a layout (excluding the connection between the engagement portions) shown in FIG. 10g. As shown, the biasing elements 45a and 45b may each comprises two legs. This aids in stabilising the actuator unit and increases the available biasing force. The biasing elements 45a and 45b may also be integral with each-other or may be separate elements. The biasing elements may also be integral with the engagement portion.

Figure 13:
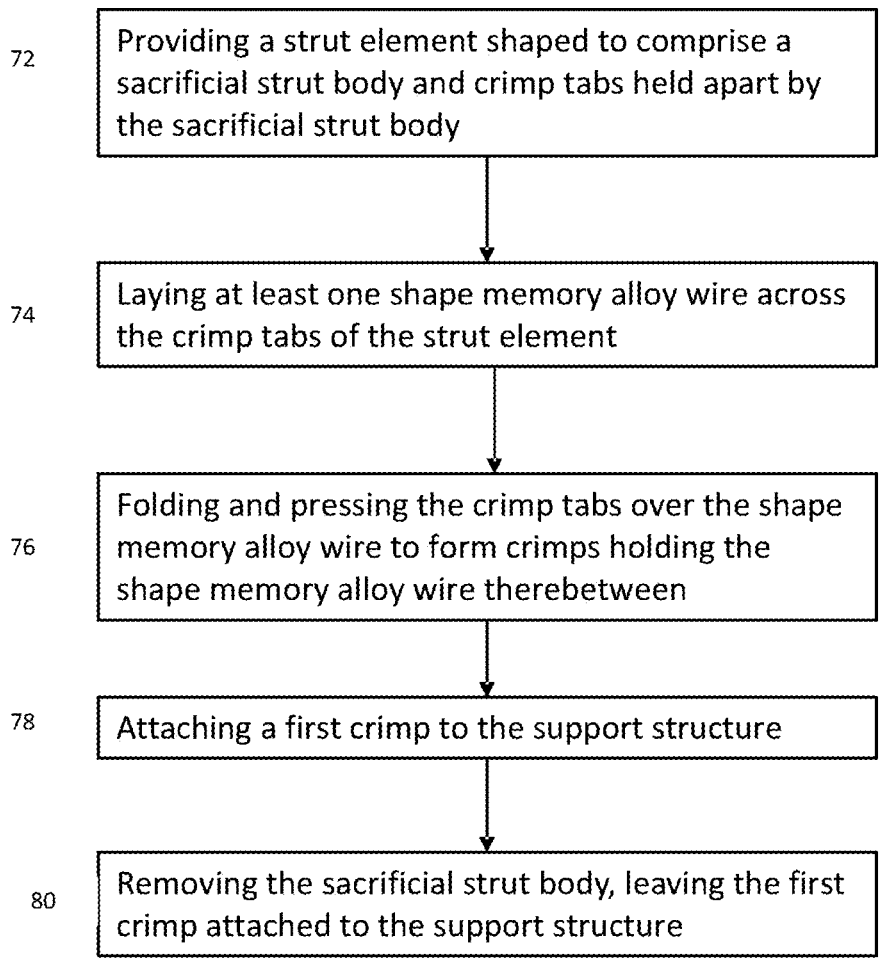
FIG. 13 shows a method of manufacture fo an SMA actuator assembly according to an embodiment.

A method of manufacturing such an actuator assembly is described with reference to FIG. 13. At step 72, a strut element shaped to comprise a sacrificial strut body and crimp tabs held apart by the sacrificial strut body is provided. In the case of the FIG. 10g layout, the strut element comprises two sacrificial strut bodies, the first of which separates a first crimp tab and a central crimp tab and the second of which separates the central crimp tab and a second crimp tab.

At step 74, at least one shape memory alloy wire is placed across the crimp tabs of the strut element. In particular, the first SMA wire 41 is connected between the first crimp tab and the central crimp tab and the second SMA wire 42 is connected between the central crimp tab and the second crimp tab.

At step 76, the crimp tabs are folded and pressed over the shape memory alloy wire to form crimps holding the shape memory alloy wire therebetween.

At step 78, a first crimp is attached to the support structure. In particular, the first and second crimps (formed from the first and second crimp tabs respectively) are attached to the support structure. The first crimp corresponds to the static crimp 61 in FIG. 10a and the second crimp corresponds to the second static crimp 62 in FIG. 10a.

At step 80, the sacrificial strut body is removed, leaving the first crimp attached to the support structure. In particular, in the case of the layout shown in FIG. 10g, the first and second sacrificial strut bodies are removed, leaving the first and second crimps connected to the support structure.

As mentioned above, both the first and second actuator units may be formed from a single etching.

Figure 11:
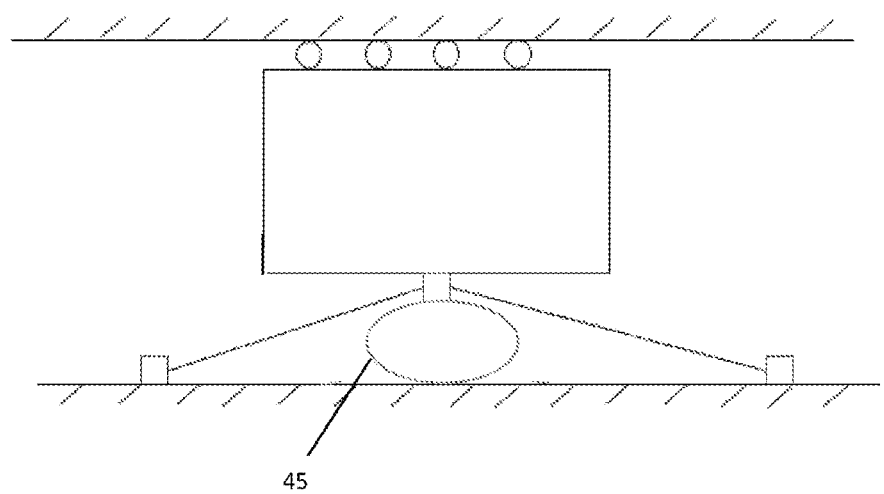
FIG. 11 shows another SMA actuator assembly according to an embodiment.

With reference to FIG. 11, an embodiment which is similar to that shown in FIGS. 10a and 10b, with the exception of the biasing element 45, is shown. In this embodiment, the biasing element 45 is an elliptical structure with resilience in the vertical direction (i.e. in a direction perpendicular to the direction of motion, 66, of the movable part 20). Accordingly, it acts to bias the engagement portion 31 into engagement with the movable part 20. When the movable part 20 is shifted left or right by the engagement portion, the biasing element 45 rocks back and forth to allow this movement (rather than sliding along the support structure as biasing elements 45a and 45b do in the embodiment shown in FIGS. 10a and b). In some embodiments, the biasing element may be fixed in some way to the support structure (e.g. the lower ends of the biasing elements 45a and 45b may be attached to the support structure). In such embodiments, the biasing element would need to have sufficiently low compliance in the direction of movement of the movable part so as not to hinder movement of the movable part. An advantage of the biasing elements being attached to the support structure (as opposed to being in sliding or rocking contact with the support structure) is that the electrical connection of the SMA may be simpler.

Figure 12A:
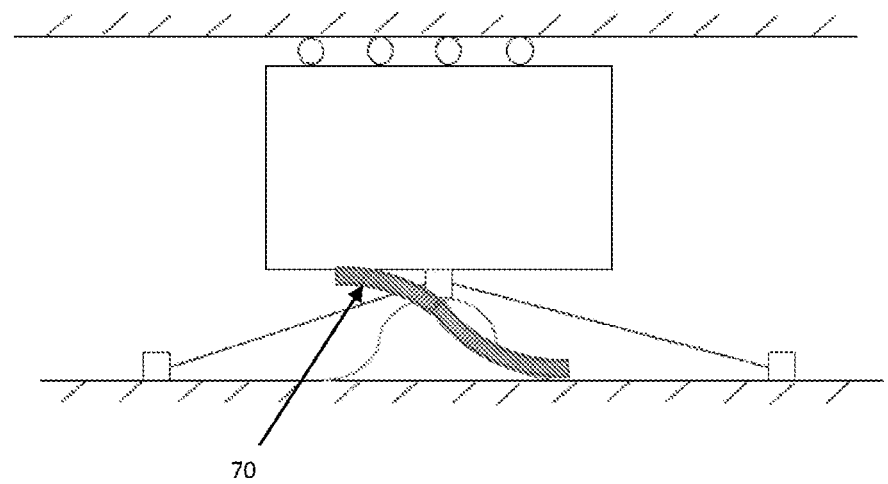
FIG. 12 shows another SMA actuator assembly according to an embodiment.
Figure 12B:
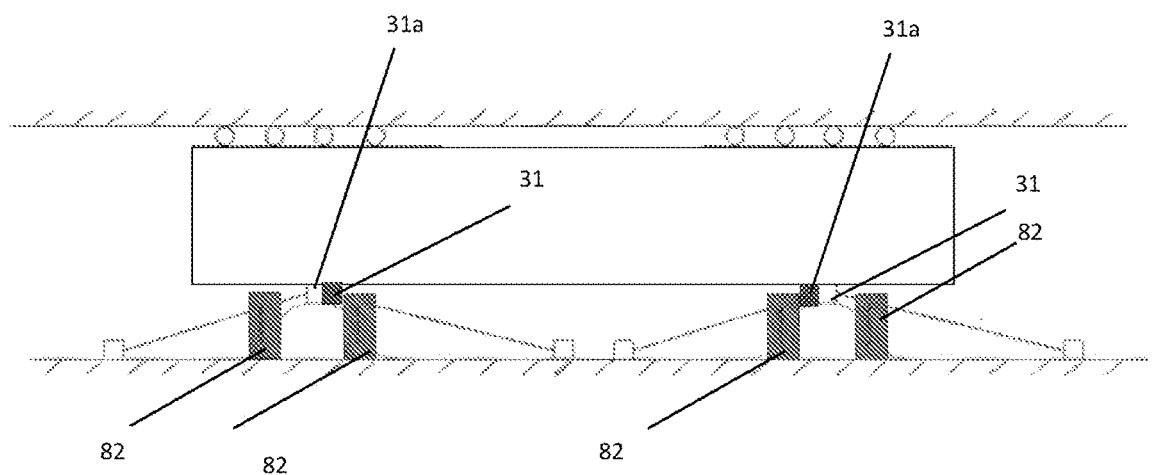

With reference to FIG. 12a, an embodiment which is similar to that shown in FIGS. 10a and 10b is described. The embodiment shown in FIG. 12a further comprises a holding arrangement 70, which comprises a flexure. This acts as a source of constant friction between the movable part 20 and the support structure 10 and acts to maintain the position of the movable part 20 when the SMA wires 41 and 42 are powered off. The friction between the holding arrangement 70 and the movable part 20 must be low enough to be overcome by the SMA wires 41 and 42 in order to move the movable component 20 but high enough to hold the movable component 20 still when the wires are unpowered. Equally, the amount of friction may be controllable, for example by a further SMA wire connected between the holding arrangement 70 and the support structure in order to control the normal force exerted by the holding arrangement on the movable part.

With reference to FIG. 12b, one or more endstops (e.g. two as shown in FIG. 12b) may be provided to constrain the movement of the movable part in the event of the application of an external force. This may prevent over-stretching of the SMA wires. The one or more endstops 82 are configured to contact the first engagement portion(s) 31 of the first and second actuator units and prevent this overstretching. The SMA wires may be controlled to position the first engagement portions up against the endstops 82 (shown as position 31a) before they are powered off in order to prevent or further limit movement of the movable part with respect to the support structure.

The embodiments described with reference to FIGS. 10a-g, 11, 12a and 12b refer to translation of a movable part along a movement direction. However, the concepts described may be equally applied to a movable part which is configured to rotate about an axis. For example, the movable part 20 may be supported on the support structure 10 in a manner that allows rotation of the movable part 20 about an axis and one or more actuator units as described with reference to FIGS. 10a-d may be configured to drive rotation of the movable part 20. In this way, instead of the left and right movements of the engagement portion(s) driving translational movement, such left and right movements would drive rotation of the movable part in first and second senses respectively.

Some of the embodiments above include springs (such as compression springs) for biasing the engagement portions against the movable part or for opposing contraction forces by select SMA wires. Such springs may be embodied by any resilient element capable of applying a spring force to a respective part, such as a flexure or other spring.

Except where the context requires otherwise, the term "bearing" is used herein as follows. The term "bearing" is used herein to encompass the terms "sliding bearing", "plain bearing", "rolling bearing", "ball bearing", "roller bearing" and "flexure". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. In embodiments, the bearing may be provided on, or may comprise, non-linear bearing surfaces.

In some embodiments of the present disclosure, more than one type of bearing element may be used in combination to provide the bearing functionality. Accordingly, the term "bearing" used herein includes any combination of, for example, plain bearings, ball bearings, roller bearings and flexures.

Although some of the above approaches have been described with specific reference to cameras and camera assemblies, it will be appreciated that the configuration and/or control of the actuator assemblies involved can be applied in other fields. In general, the SMA actuator assembly need not be used for control of an iris or camera element, but may be used in any other applications. For example, the actuator assemblies driving rotation of a rotating part may be used in an SMA motor (e.g. a continuous drive motor), for example for the purpose of driving gimbals in a drone, driving wheels of a model car, or for any other applications. For example, the actuator assemblies described herein may be used for movement of one or more optical elements for the purpose of athermalisation. The actuator assemblies driving translational movement of a movable part may be incorporated into any actuator assemblies requiring linear drive. This includes SMA actuator assemblies, which conventionally make use of SMA wires to drive translational movement of a part. Here, the SMA wires may be replaced by the movable part, to thereby increase stroke and enable (in some embodiments) bi-directional actuation.

The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

Those skilled in the art will appreciate that while the foregoing has described what is considered to be the best mode and where appropriate other modes of performing the present disclosure, the present disclosure should not be limited to the specific configurations and methods disclosed in this description of the preferred embodiment. Those skilled in the art will recognize that the present invention has a broad range of applications, and that the embodiments may take a wide range of modifications without departing from any inventive concept as defined in the appended claims.

The following is also disclosed:

1. An SMA actuator assembly for driving or rotating a movable part in a predetermined direction or sense by a plurality of repeated incremental steps, the SMA actuator assembly comprising:
   the movable part;
   a first engagement portion for engaging the movable part;
   at least one SMA wire arranged to move the first engagement portion such that the first engagement portion repeatedly, for each of said incremental steps, is configured to:
      engage with the movable part from a starting position;
      exert a force or torque on the movable part in the predetermined direction; and
      disengage from the movable part and return to the starting position,
   wherein the exertion of the force or torque on the movable part and/or the engaging or disengaging with the movable part are caused by contraction or relaxation of the at least one SMA wire.

2. The SMA actuator assembly of item 1, wherein the at least one SMA wire is arranged to move the first engagement portion, so as to cause driving or rotating of the movable part in a second direction or sense that is opposite to the predetermined direction or sense by a plurality of repeated incremental steps, such that the first engagement portion repeatedly is configured to:
   engage with the movable part from a starting position;
   exert a force or torque on the movable part in the second direction or sense; and
   disengage from the movable part and return to the starting position,
   wherein the exertion of the force or torque on the movable part and/or the engaging or disengaging with the movable part are caused by contraction or relaxation of the at least one SMA wire.

3. The SMA actuator assembly of item 1 or 2, wherein the at least one SMA wire comprises at least two SMA wires, wherein one SMA wire is arranged to control the engagement and/or disengagement of the first engagement portion and another SMA wire is arranged to independently cause the first engagement portion to exert the force or torque on the movable part.

4. The SMA actuator assembly of any one of the preceding items, wherein the at least one SMA wire comprises at least two SMA wires, wherein one SMA wire is arranged, on contraction, to cause the first engagement portion to exert a force or torque on the movable part in the predetermined direction or sense and another SMA wire is arranged, on contraction, to cause the first engagement portion to exert a force or torque on the movable part in the second direction or sense.

5. The SMA actuator assembly of any one of the preceding items, comprising at least two SMA wires, wherein two SMA wires together are arranged to control the engagement and/or disengagement of the first engagement portion, wherein one of the two SMA wires is arranged, on contraction, to cause the first engagement portion to exert a force or torque on the movable part in the predetermined direction or sense and the other of the two SMA wires is arranged, on contraction, to cause the first engagement portion to exert a force or torque on the movable part in the second direction or sense.

6. The SMA actuator assembly of any one of the preceding items, further comprising a holding engagement portion for engaging the movable part, wherein an SMA wire is arranged to move the holding engagement portion so as to engage with the movable part to maintain the position of the movable part during at least a part of the time when the first engagement portion is disengaged from the movable part.

7. The SMA actuator assembly of any one of the preceding items, further comprising at least one second engagement portion for engaging the movable part, wherein at least one SMA wire is arranged move the at least one second engagement portion such that each of the at least one second engagement portion repeatedly, for each of said incremental steps, is configured to:
  engage with the movable part from a starting position;
  exert a force or torque on the movable part in the predetermined direction or sense; and
  disengage from the movable part and return to the starting position,
  wherein the exertion of the force or torque on the movable part and/or the engaging with or disengaging from the movable part are caused by contraction or relaxation of the at least one SMA wire.

8. The SMA actuator assembly of item 7, wherein the at least one second engagement portion exerts a force or torque on the movable part during at least part of the time when the first engagement portion is disengaged from the movable part.

9. The SMA actuator assembly of item 7 or 8, wherein the at least one second engagement portion exerts a force or torque on the movable part during the time when the first engagement portion is disengaged from the movable part such that a force or torque is continuously applied to the movable part either by the first or by the at least one second engagement portion.

10. The SMA actuator assembly of any one of items 7 to 9, wherein the at least one second engagement portion is configured to engage the movable part before the first engagement portion disengages from the movable part, and wherein the first engagement portion is configured to engage the movable part before the at least one second engagement portion disengages from the movable part.

11. The SMA actuator assembly of any one of the preceding items, wherein the first and/or at least one second engagement portions have a series of first teeth and the movable part has a series of second teeth and the first and second teeth are arranged to engage with each other when an engagement portion engages with the movable part.

12. The SMA actuator assembly of any one of items 1 to 10, wherein the first and/or at least one second engagement portions are arranged to transfer force exerted by an SMA wire to the movable part by friction.

13. The SMA actuator assembly of any one of the preceding items, further including a biasing element which is arranged to oppose the motion caused by the contraction of at least one SMA wire.

14. The SMA actuator assembly of any one of the preceding items, wherein the movable part is elongate in the predetermined direction and translationally movable in the predetermined direction.

15. The SMA actuator assembly of any one of items 1 to 13, wherein the movable part is a rotating part that is rotatable about a rotation axis.

16. The SMA actuator assembly of any one of the preceding items, wherein the first engagement portion is mounted on a housing, the housing being pivotable relative to the movable part, wherein the pivoting of the housing is arranged to amplify the contraction or relaxation of the SMA wire to cause a greater extent of movement of the first engagement portion in the predetermined direction.

17. The SMA actuator assembly of any one of the preceding items, further comprising a bearing which is arranged to allow the movable part to move or rotate in the predetermined direction or sense and, as appropriate, the second direction or sense.

18. The SMA actuator assembly of any one of the preceding items, further comprising an iris mechanism arranged to control the size of an aperture in an iris, wherein the movable part is coupled to the iris mechanism so that motion of the movable part in the predetermined direction causes the aperture to open or close.

19. The SMA actuator assembly of item 18, wherein the coupling of the movable part to the iris mechanism amplifies the movement or rotation of the movable part.

20. The SMA actuator assembly of item 18 or 19, further including the iris having the aperture.

21. The SMA actuator assembly of item 20, further comprising an image sensor arranged to receive light passing through the iris.

22. The SMA actuator assembly of item 21, further including:
  a control circuit electrically connected to the at least one SMA wire for supplying drive signals thereto; and
  a sensor arranged to generate output signals representative of the amount or intensity of light arriving at the image sensor,
  wherein the control circuit is arranged to generate the drive signals in response to said output signals to open or close the aperture and thereby adjust the amount of light arriving at the image sensor.

23. An SMA actuator assembly for rotating a rotating part in a predetermined sense by a plurality of repeated incremental steps, the SMA actuator assembly comprising:
  the rotating part;
  a first engagement portion for engaging the rotating part;
  at least one SMA wire arranged to move the first engagement portion such that the first engagement portion repeatedly, for each of said incremental steps, is configured to:

engage with the movable part from a starting position;
move so as to exert a torque on the movable part in the predetermined sense; and
disengage from the movable part and return to the starting position,
wherein the exertion of the torque on the movable part and/or the engaging or disengaging with the movable part are caused by contraction or relaxation of the at least one SMA wire.

24. The SMA actuator assembly of item 23, comprising another SMA wire arranged to move the first engagement portion, so as to cause rotating of the rotating part in a second sense that is opposite to the predetermined sense by a plurality of repeated incremental steps, such that the first engagement portion repeatedly is configured to:
engage with the rotating part from a starting position;
move so as to exert a torque on the rotating part in the second sense; and
disengage from the rotating part and return to the starting position,
wherein the exertion of the torque on the movable part and/or the engaging or disengaging with the movable part are caused by contraction or relaxation of the other SMA wire.

25. The SMA actuator assembly of item 23 or 24, further comprising at least one second engagement portion for engaging the rotating part, wherein at least one second SMA wire is arranged move a respective at least one second engagement portion such that each of the at least one second engagement portion repeatedly, for each of said incremental steps, is configured to:
engage with the rotating part from a respective starting position;
move so as to exert a torque on the rotating part in the predetermined sense; and
disengage from the movable part and return to the starting position,
wherein the exertion of the torque on the rotating part and/or the engaging or disengaging with the rotating part are caused by contraction or relaxation of the at least one second SMA wire.

26. A method of manufacturing the SMA actuator assembly of any one of the preceding items, the method comprising:
providing a strut element shaped to comprise a sacrificial strut body and crimp tabs held apart by the sacrificial strut body;
laying at least one shape memory alloy wire across the crimp tabs of the strut element;
folding and pressing the crimp tabs over the shape memory alloy wire to form crimps holding the shape memory alloy wire therebetween;
attaching a first crimp to the support structure; and
removing the sacrificial strut body, leaving the first crimp attached to the support structure.

27. The method according to item 26, wherein the at least one SMA wire is held between the first crimp and a central crimp, which is integral with or coupled to the first engagement portion.

28. The method according to item 27, wherein the central crimp is integral with a portion which is bent to form the biasing element.

The invention claimed is:

1. A shape memory alloy (SMA) actuator assembly for driving or rotating a movable part in a predetermined direction or sense by a plurality of repeated incremental steps, the SMA actuator assembly comprising:
the movable part;
a first engagement portion for engaging the movable part;
a second engagement portion for engaging the movable part;
two SMA wires arranged to move the first engagement portion such that the first engagement portion repeatedly, for each of said incremental steps, is configured to:
engage with the movable part from a starting position;
exert a force or torque on the movable part in the predetermined direction; and
disengage from the movable part and return to the starting position,
wherein:
the exertion of the force or torque on the movable part and the engaging and disengaging with the movable part are caused by contraction or relaxation of the two SMA wires,
the two SMA wires together are arranged to control the engagement and/or disengagement of the first engagement portion,
a first SMA wire of the two SMA wires is arranged, on contraction, to cause the first engagement portion to exert a force or torque on the movable part in the predetermined direction or sense,
a second of the two SMA wires is arranged, on contraction, to cause the first engagement portion to exert a force or torque on the movable part in a second direction or sense that is opposite to the predetermined direction or sense, and
at least one SMA wire is arranged to move the second engagement portion to engage with the movable part to control the position of the movable part during at least a part of the time when the first engagement portion is disengaged from the movable part.

2. The SMA actuator assembly of claim 1, wherein the two SMA wires are arranged to move the first engagement portion to cause driving or rotating of the movable part in the second direction or sense by a plurality of repeated incremental steps, such that the first engagement portion repeatedly is configured to:
engage with the movable part from a starting position;
exert a force or torque on the movable part in the second direction or sense; and
disengage from the movable part and return to the starting position, wherein the exertion of the force or torque on the movable part and/or the engaging or disengaging with the movable part are caused by contraction or relaxation of the two SMA wires.

3. The SMA actuator assembly of claim 1, wherein the first and second SMA wires are angled with respect to each other.

4. The SMA actuator assembly of claim 1, wherein the at least one SMA wire is arranged to move the second engagement portion such that the second engagement portion repeatedly, for each of said incremental steps, is configured to:
engage with the movable part from a starting position;
exert a force or torque on the movable part in the predetermined direction or sense; and
disengage from the movable part and return to the starting position,
wherein the exertion of the force or torque on the movable part and/or the engaging with or disengaging from the movable part are caused by contraction or relaxation of the at least one SMA wire.

5. The SMA actuator assembly of claim 4, wherein:
the at least one SMA wire comprises two further SMA wires;
- the two further SMA wires together are arranged to control the engagement and/or disengagement of the second engagement portion;
- a first SMA wire of the two further SMA wires is arranged, on contraction, to cause the second engagement portion to exert a force or torque on the movable part in the predetermined direction or sense; and a second of the two further SMA wires is arranged, on contraction, to cause the second engagement portion to exert a force or torque on the movable part in the second direction or sense.

6. The SMA actuator assembly of claim 1, wherein:
the second engagement portion exerts a force or torque on the movable part during at least part of the time when the first engagement portion is disengaged from the movable part; and
the second engagement portion exerts a force or torque on the movable part during the time when the first engagement portion is disengaged from the movable part such that a force or torque is continuously applied to the movable part either by the first or by the second engagement portion.

7. The SMA actuator assembly of claim 1, wherein:
the second engagement portion is configured to engage the movable part before the first engagement portion disengages from the movable part; and
the first engagement portion is configured to engage the movable part before the second engagement portion disengages from the movable part.

8. The SMA actuator assembly of claim 1, wherein:
the first and/or second engagement portions have a series of first teeth and the movable part has a series of second teeth, wherein teeth of the series of first and second teeth are arranged to engage with each other when an engagement portion engages with the movable part, or
the first and/or second engagement portions are arranged to transfer force exerted by an SMA wire to the movable part by friction.

9. The SMA actuator assembly of claim 1, further comprising:
- a support structure; and
- a biasing element arranged to bias the first engagement portion into or out of engagement with the movable part, wherein the biasing element is in sliding or rolling contact with the support structure such that as the first engagement portion exerts a force or torque on the movable part, the biasing element slides or rolls relative to the support structure.

10. The SMA actuator assembly of claim 1, wherein:
the first engagement portion is mounted on a housing, the housing being pivotable relative to the movable part; and
- the pivoting of the housing is arranged to amplify the contraction or relaxation of the first and/or second SMA wire of the two SMA wires to cause a greater extent of movement of the first engagement portion in the predetermined direction.

11. The SMA actuator assembly of claim 1, further comprising an iris mechanism arranged to control the size of an aperture in an iris, wherein the movable part is coupled to the iris mechanism so that motion of the movable part in the predetermined direction causes the aperture to open or close.

* * * * *